United States Patent
Rabarijaona et al.

(10) Patent No.: US 10,097,444 B2
(45) Date of Patent: Oct. 9, 2018

(54) COMMUNICATION DEVICE AND COMMUNICATION METHOD FOR COMMUNICATION TO A ROOT DEVICE

(71) Applicant: NATIONAL INSTITUTE OF INFORMATION AND COMMUNICATIONS TECHNOLOGY, Koganei-shi, Tokyo (JP)

(72) Inventors: Verotiana Rabarijaona, Koganei (JP); Fumihide Kojima, Koganei (JP); Hiroshi Harada, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 0 days.

(21) Appl. No.: 15/022,558

(22) PCT Filed: Sep. 9, 2014

(86) PCT No.: PCT/JP2014/004625
§ 371 (c)(1),
(2) Date: Mar. 16, 2016

(87) PCT Pub. No.: WO2015/040821
PCT Pub. Date: Mar. 26, 2015

(65) Prior Publication Data
US 2016/0226749 A1    Aug. 4, 2016

(30) Foreign Application Priority Data

Sep. 17, 2013  (JP) .................................. 2013-191358

(51) Int. Cl.
*H04L 12/751*    (2013.01)
*H04L 12/64*    (2006.01)
(Continued)

(52) U.S. Cl.
CPC .......... *H04L 45/02* (2013.01); *H04L 12/6418* (2013.01); *H04L 45/18* (2013.01);
(Continued)

(58) Field of Classification Search
CPC ......... H04L 12/6418; H04L 2012/6443; H04L 45/02; H04L 45/18; H04L 45/28; H04L 45/48
See application file for complete search history.

(56) References Cited

U.S. PATENT DOCUMENTS

2006/0173927 A1 *  8/2006  Beyer ............... G06F 17/30961
2008/0270435 A1 * 10/2008  Furusho ............ G06F 17/30961

FOREIGN PATENT DOCUMENTS

JP        2011030050 A     2/2011

OTHER PUBLICATIONS

T Winter, Ed., RPL: Routing Protocol for Low Power and Lossy Networks, Aug. 3, 2009.*
(Continued)

*Primary Examiner* — Mewale Ambaye
(74) *Attorney, Agent, or Firm* — Holtz, Holtz & Volek PC

(57) ABSTRACT

Efficiency of communication to a root device is improved. A broadcast hello packet including a hierarchical number is received; the hello packets of one or more devices are collected and an own-device-hierarchical-number is set to a value by adding one to the smallest number of the hierarchical numbers; each device having a hierarchical number smaller than the own-device-hierarchical-number by one is retained as a parent device; each device having the same hierarchical number as the own-device-hierarchical-number is retained as a sibling device; each device having a hierarchical number larger than the own-device-hierarchical-number by one or more is retained as a child device; an indication of the retaining as the parent device, as the sibling device,
(Continued)

and as the child device are each transmitted so as to reach the parent device, the sibling device, and the child device; and a hello packet including the own-device hierarchical number is broadcast.

6 Claims, 20 Drawing Sheets

(51) Int. Cl.
  *H04W 40/24* (2009.01)
  *H04L 12/705* (2013.01)
  *H04L 12/703* (2013.01)
  *H04L 12/753* (2013.01)

(52) U.S. Cl.
  CPC .............. *H04L 45/28* (2013.01); *H04L 45/48* (2013.01); *H04L 2012/6443* (2013.01); *H04W 40/24* (2013.01)

(56) References Cited

OTHER PUBLICATIONS

IEEE 802.15.4, IEEE 802.15.4g, IEEE 802.15.4e Standard.
International Search Report (ISR) dated Oct. 7, 2014 issued in International Application No. PCT/JP2014/004625.
T. Winter, Ed., RPL: Routing Protocol for Low Power and Lossy Networks, draft-ietf-roll-rpl-00, Aug. 3, 2009.
International Preliminary Report on Patentability (IPRP) including Written Opinion (in English) dated Mar. 31, 2016, issued in parent International Application No. PCT/JP2014/004625.

* cited by examiner

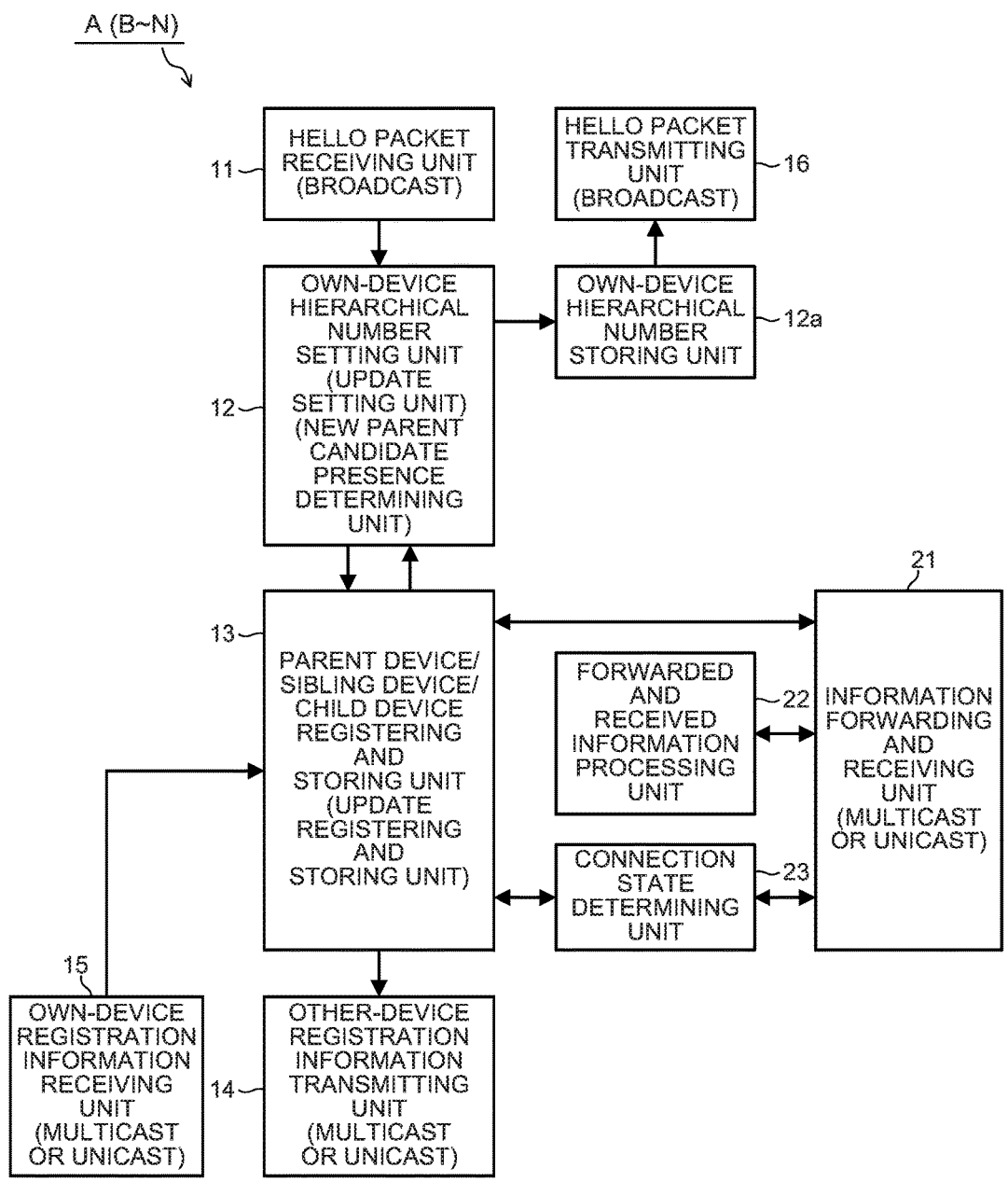

FIG. 2

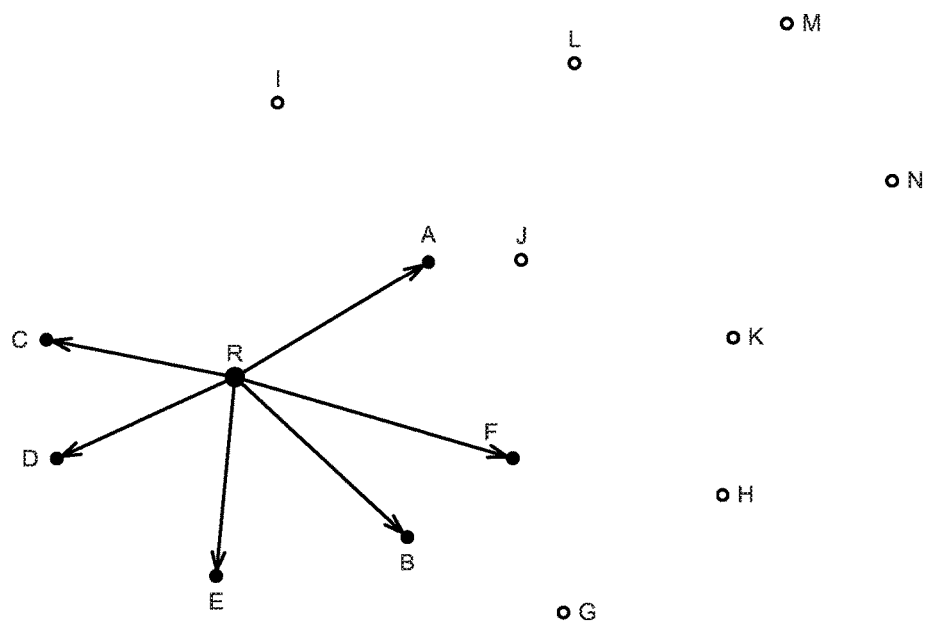

R BROADCAST → ABCDEF UNICAST (Ack)

| DEVICE IDENTIFIER | SET HIERARCHICAL NUMBER | TRANSMITTING AND RECEIVING MODE | NEWLY SET HIERARCHICAL NUMBER | PARENT DEVICE | SIBLING DEVICE | CHILD DEVICE |
|---|---|---|---|---|---|---|
| R | 0 | BC TRANSMISSION, MC/UC RECEPTION | 0 | — | — ③→ | ABCDEF |
| A | — | BC RECEPTION, MC/UC TRANSMISSION | 1 | R | — | — |
| B | — | BC RECEPTION, MC/UC TRANSMISSION | 1 | R | — | — |
| C | — | BC RECEPTION, MC/UC TRANSMISSION | ①→ 1 | ②  R | — | — |
| D | — | BC RECEPTION, MC/UC TRANSMISSION | 1 | R | — | — |
| E | — | BC RECEPTION, MC/UC TRANSMISSION | 1 | R | — | — |
| F | — | BC RECEPTION, MC/UC TRANSMISSION | 1 | R | — | — |
| G | — | — | — | — | — | — |
| H | — | — | — | — | — | — |
| I | — | — | — | — | — | — |
| J | — | — | — | — | — | — |
| K | — | — | — | — | — | — |
| L | — | — | — | — | — | — |
| M | — | — | — | — | — | — |
| N | — | — | — | — | — | — |

FIG. 3A

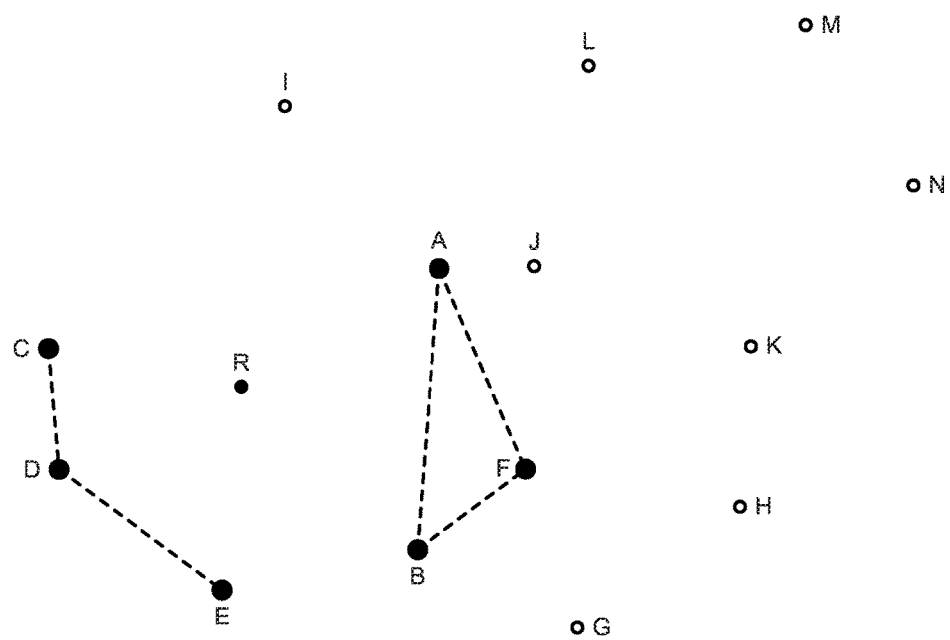

ABCDEF BROADCAST → ABCDEF MULTI/UNICAST (Ack)

| DEVICE IDENTIFIER | SET HIERARCHICAL NUMBER | TRANSMITTING AND RECEIVING MODE | NEWLY SET HIERARCHICAL NUMBER | PARENT DEVICE | SIBLING DEVICE | CHILD DEVICE |
|---|---|---|---|---|---|---|
| R | 0 | — | 0 | — | — | ABCDEF |
| A | 1 | BC TRANSMISSION, MC/UC RECEPTION | 1 | R | BF | — |
| B | 1 | BC TRANSMISSION, MC/UC RECEPTION | 1 | R | AF | — |
| C | 1 | BC TRANSMISSION, MC/UC RECEPTION | 1 | R | D | — |
| D | 1 | BC TRANSMISSION, MC/UC RECEPTION | 1 | R | CE | — |
| E | 1 | BC TRANSMISSION, MC/UC RECEPTION | 1 | R | D | — |
| F | 1 | BC TRANSMISSION, MC/UC RECEPTION | 1 | R | AB | — |
| G | — | — | — | — | — | — |
| H | — | — | — | — | — | — |
| I | — | — | — | — | — | — |
| J | — | — | — | — | — | — |
| K | — | — | — | — | — | — |
| L | — | — | — | — | — | — |
| M | — | — | — | — | — | — |
| N | — | — | — | — | — | — |

FIG. 3B

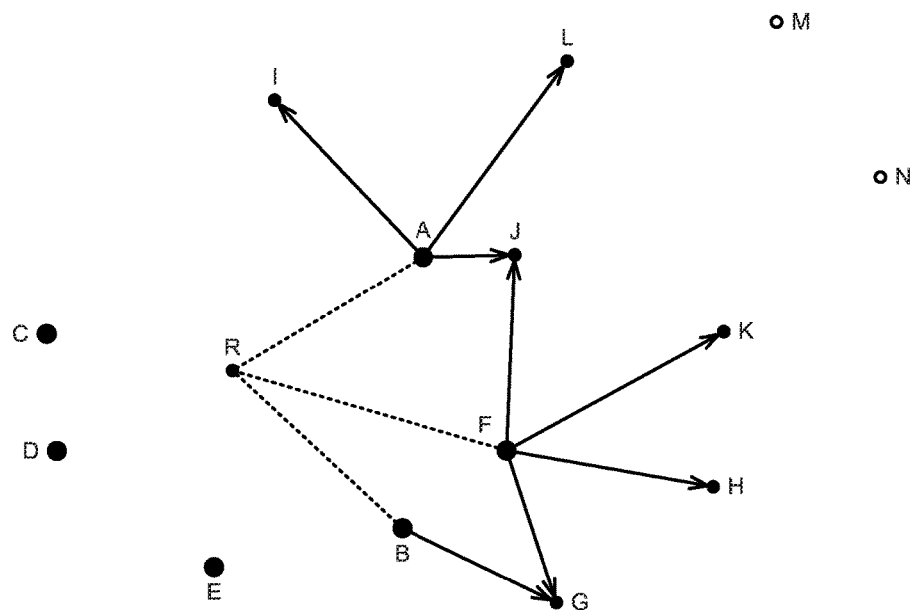

ABCDEF BROADCAST → GHIJKLF MULTI/UNICAST (Ack)

| DEVICE IDENTIFIER | SET HIERARCHICAL NUMBER | TRANSMITTING AND RECEIVING MODE | NEWLY SET HIERARCHICAL NUMBER | PARENT DEVICE | SIBLING DEVICE | CHILD DEVICE |
|---|---|---|---|---|---|---|
| R | 0 | — | 0 | — | — | ABCDEF |
| A | 1 | BC TRANSMISSION, MC/UC RECEPTION | 1 | R | BF | IJL |
| B | 1 | BC TRANSMISSION, MC/UC RECEPTION | 1 | R | AF | G |
| C | 1 | BC TRANSMISSION | 1 | R | D ③ | — |
| D | 1 | BC TRANSMISSION | 1 | R | CE | — |
| E | 1 | BC TRANSMISSION | 1 | R | D | — |
| F | 1 | BC TRANSMISSION, MC/UC RECEPTION | 1 | R | AB | GHJK |
| G | — | BC RECEPTION, MC/UC TRANSMISSION | 2 | BF | — | — |
| H | — | BC RECEPTION, MC/UC TRANSMISSION | 2 | F | — | — |
| I | — | BC RECEPTION, MC/UC TRANSMISSION | 2 | A | — | — |
| J | — | BC RECEPTION, MC/UC TRANSMISSION | 2 | AF | — | — |
| K | — | BC RECEPTION, MC/UC TRANSMISSION | 2 | F | — | — |
| L | — | BC RECEPTION, MC/UC TRANSMISSION | 2 | A | — | — |
| M | — | — | — | — | — | — |
| N | — | — | — | — | — | — |

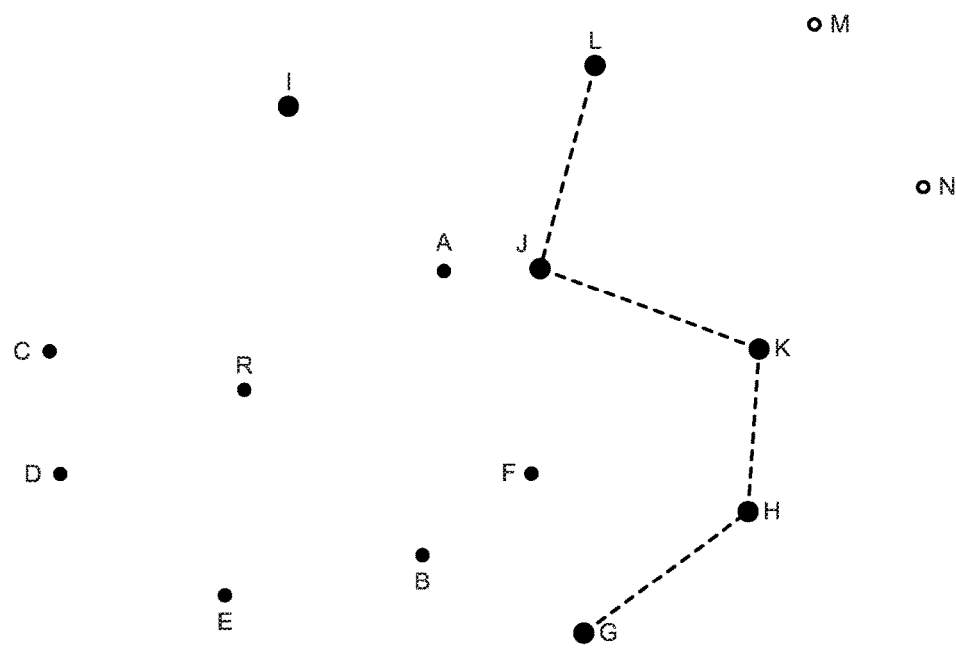

FIG. 4A

GHIJKL BROADCAST → GHIJKL MULTI/UNICAST (Ack)

| DEVICE IDENTIFIER | SET HIERARCHICAL NUMBER | TRANSMITTING AND RECEIVING MODE | NEWLY SET HIERARCHICAL NUMBER | PARENT DEVICE | SIBLING DEVICE | CHILD DEVICE |
|---|---|---|---|---|---|---|
| R | 0 | — | 0 | — | — | ABCDEF |
| A | 1 | — | 1 | R | BF | IJL |
| B | 1 | — | 1 | R | AF | G |
| C | 1 | — | 1 | R | D | — |
| D | 1 | — | 1 | R | CE | — |
| E | 1 | — | 1 | R | D | — |
| F | 1 | — | 1 | R | AB | GHJK |
| G | 2 | BC TRANSMISSION, MC/UC RECEPTION | 2 | BF | H | — |
| H | 2 | BC TRANSMISSION, MC/UC RECEPTION | 2 | F | GK | — |
| I | 2 | BC TRANSMISSION | 2 | A | — | — |
| J | 2 | BC TRANSMISSION, MC/UC RECEPTION | 2 | AF | KL | — |
| K | 2 | BC TRANSMISSION, MC/UC RECEPTION | 2 | F | JH | — |
| L | 2 | BC TRANSMISSION, MC/UC RECEPTION | 2 | A | J | — |
| M | — | — | — | — | — | — |
| N | — | — | — | — | — | — |

FIG. 4B

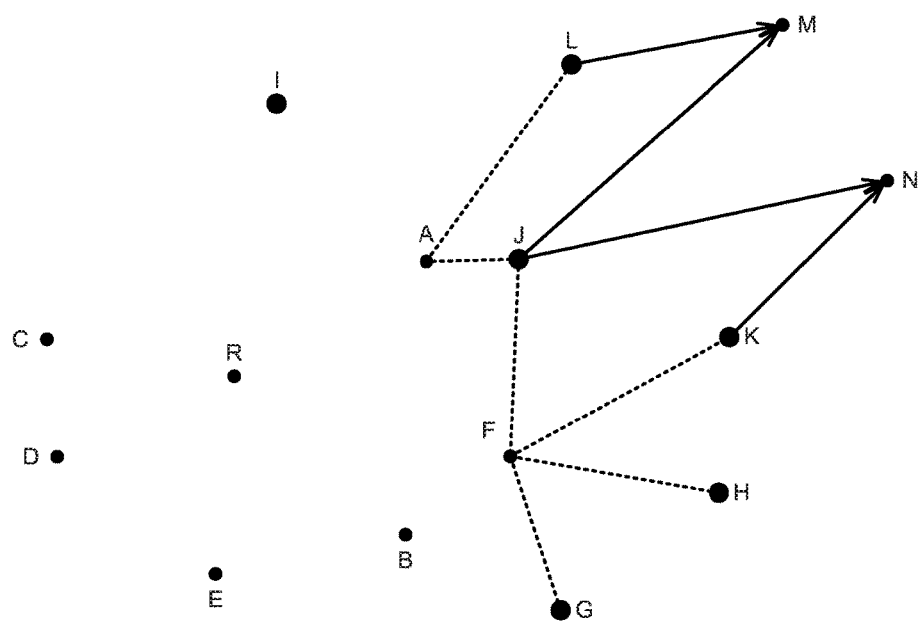

GHIJKL BROADCAST → MN MULTI/UNICAST (Ack)

| DEVICE IDENTIFIER | SET HIERARCHICAL NUMBER | TRANSMITTING AND RECEIVING MODE | NEWLY SET HIERARCHICAL NUMBER | PARENT DEVICE | SIBLING DEVICE | CHILD DEVICE |
|---|---|---|---|---|---|---|
| R | 0 | — | 0 | — | — | ABCDEF |
| A | 1 | — | 1 | R | BF | IJL |
| B | 1 | — | 1 | R | AF | G |
| C | 1 | — | 1 | R | D | — |
| D | 1 | — | 1 | R | CE | — |
| E | 1 | — | 1 | R | D | — |
| F | 1 | — | 1 | R | AB | GHJK |
| G | 2 | BC TRANSMISSION | 2 | BF | H | — |
| H | 2 | BC TRANSMISSION | 2 | F | GK | — |
| I | 2 | BC TRANSMISSION | 2 | A | — | — |
| J | 2 | BC TRANSMISSION, MC/UC RECEPTION | 2 | AF | KL | MN |
| K | 2 | BC TRANSMISSION, MC/UC RECEPTION | 2 | F | JH | N |
| L | 2 | BC TRANSMISSION, MC/UC RECEPTION | 2 | A | J | M |
| M | — | BC RECEPTION, MC/UC TRANSMISSION | 3 | JL | — | — |
| N | — | BC RECEPTION, MC/UC TRANSMISSION | 3 | JK | — | — |

MN BROADCAST → MN MULTI/UNICAST (Ack)

| DEVICE IDENTIFIER | SET HIERARCHICAL NUMBER | TRANSMITTING AND RECEIVING MODE | NEWLY SET HIERARCHICAL NUMBER | PARENT DEVICE | SIBLING DEVICE | CHILD DEVICE |
|---|---|---|---|---|---|---|
| R | 0 | – | 0 | – | – | ABCDEF |
| A | 1 | – | 1 | R | BF | IJL |
| B | 1 | – | 1 | R | AF | G |
| C | 1 | – | 1 | R | D | – |
| D | 1 | – | 1 | R | CE | – |
| E | 1 | – | 1 | R | D | – |
| F | 1 | – | 1 | R | AB | GHJK |
| G | 2 | – | 2 | BF | H | – |
| H | 2 | – | 2 | F | GK | – |
| I | 2 | – | 2 | A | – | – |
| J | 2 | – | 2 | AF | KL | MN |
| K | 2 | – | 2 | F | JH | N |
| L | 2 | – | 2 | A | J | M |
| M | 3 | BC TRANSMISSION, MC/UC RECEPTION | 3 | JL | N | – |
| N | 3 | BC TRANSMISSION, MC/UC RECEPTION | 3 | JK | M | – |

FIG. 7D

| DEVICE IDENTIFIER | SET HIERARCHICAL NUMBER | TRANSMITTING AND RECEIVING MODE | NEWLY SET HIERARCHICAL NUMBER | PARENT DEVICE | SIBLING DEVICE | CHILD DEVICE |
|---|---|---|---|---|---|---|
| R | 0 | – | 0 | – | – | ABCDEF |
| A | 1 | – | 1 | R | BF | IJL |
| B | 1 | – | 1 | R | AF | G |
| C | 1 | – | 1 | R | D | – |
| D | 1 | – | 1 | R | CE | – |
| E | 1 | – | 1 | R | D | – |
| F | 1 | – | 1 | R | AB | G~~I~~JK |
| G | 2 | BC TRANSMISSION, MC/UC RECEPTION | 2 | BF | ~~H~~ | H |
| H | 2 | BC RECEPTION, MC/UC TRANSMISSION | 3 | ~~F~~GK | ~~G~~K | – |
| I | 2 | – | 2 | A | – | – |
| J | 2 | – | 2 | AF | KL | MN |
| K | 2 | BC TRANSMISSION, MC/UC RECEPTION | 2 | F | J~~H~~ | HN |
| L | 2 | – | 2 | A | J | M |
| M | 3 | – | 3 | JL | N | – |
| N | 3 | – | 3 | JK | M | – |

FIG. 8D

| DEVICE IDENTIFIER | SET HIERARCHICAL NUMBER | TRANSMITTING AND RECEIVING MODE | NEWLY SET HIERARCHICAL NUMBER | PARENT DEVICE | SIBLING DEVICE | CHILD DEVICE |
|---|---|---|---|---|---|---|
| R | 0 | — | 0 | — | — | ABCDEF |
| A | 1 | BC TRANSMISSION, MC/UC RECEPTION | 1 | R | BF | IJLM |
| B | 1 | — | 1 | R | AF | G |
| C | 1 | — | 1 | R | D | — |
| D | 1 | — | 1 | R | CE | — |
| E | 1 | — | 1 | R | D | — |
| F | 1 | — | 1 | R | AB | GHJK |
| G | 2 | — | 2 | BF | H | — |
| H | 2 | — | 2 | F | GK | — |
| I | 2 | — | 2 | A | — | — |
| J | 2 | BC RECEPTION | 2 | AF | KLM | ~~MN~~ |
| K | 2 | — | 2 | F | JH | N |
| L | 2 | BC RECEPTION | 2 | A | JM | ~~M~~ |
| M | 3 | BC RECEPTION, MC/UC TRANSMISSION, BC TRANSMISSION | 2 | A~~JL~~ | JL~~N~~ | N |
| N | 3 | BC RECEPTION | 3 | JKM | ~~M~~ | — |

COMMUNICATION DEVICE AND COMMUNICATION METHOD FOR COMMUNICATION TO A ROOT DEVICE

TECHNICAL FIELD

The present invention relates to a communication device forming a network with a hierarchical structure and a communication method, and in particular, to a communication device and a communication method which are effective for improving efficiency of communication to a root device located at the highest level of the hierarchical structure.

BACKGROUND ART

In network communication based on a hierarchical structure, devices are arranged as a tree topology with a root device being at the highest level. In such a tree topology, the devices each have only one parent device that is at its immediately higher level. A parent-child relation is established by exchange of a control frames between the relevant devices. Information that has to reach the root device is transmitted as a packet while sequentially relayed (=multi-hopping) from the devices to their parent devices.

In such network communication, if a communication failure occurs in data transmission from a child device to its parent device, the communication failure results in a packet loss at this point in time since no other route leading to the root device has been established. When such a state continues for a certain time, it is necessary for the child device to search for a new parent device to establish a new parent-child relation. Such necessity also arises when the parent device of this child device leaves the network due to some reason. That is, in these cases, when the function as the parent device becomes incomplete, an operation to recover the communication from its descendent devices to the root device takes place and this operation takes a time, which lowers efficiency of the data transmission.

PRIOR ART REFERENCES

Non-Patent References

Non-patent Reference 1: IEEE 802.15.4, IEEE 802.15.4g, IEEE 802.15.4e Standard Specifications

SUMMARY OF THE INVENTION

Problems to be Solved by the Invention

It is an object of the present invention to provide a communication device forming a network with a hierarchical structure and a communication method, the communication device and the communication method being capable of improving efficiency of communication to a root device located at the highest level of the hierarchical structure.

Means for Solving the Problems

To solve the aforesaid problem, a communication device being one aspect of the present invention includes: a first receiver configured to receive a first hello packet being a hello packet broadcast from a transmitting device, the hello packet including, as information, at least an identifier of the transmitting device and a hierarchical number indicating a number of hops necessary for the transmitting device to communicate with a root device located at a highest level of a hierarchical structure; a collector and a setter configured to collect the first hello packet having been broadcast from one or more transmitting devices and to set an own-device hierarchical number being a hierarchical number of an own device, to a value obtained by adding one to a smallest hierarchical number in the one or more transmitting devices; a first retainer configured to register and store, as a parent device, each transmitting device having a hierarchical number smaller than the own-device hierarchical number by one, out of the one or more transmitting devices; a second retainer configured to register and store, as a sibling device, each transmitting device having a same hierarchical number as the own-device hierarchical number, out of the one or more transmitting devices; a third retainer configured to register and store, as a child device, each transmitting device having a hierarchical number larger than the own-device hierarchical number by one or more, out of the one or more transmitting devices; a first transmitter configured to transmit first other-device registration information so as to make the first other-device registration information reach the parent device, the first other-device registration information being information including an indication of having been retained as the parent device; a second transmitter configured to transmit second other-device registration information so as to make the second other-device registration information reach the sibling device, the second other-device registration information being information including an indication of having been retained as the sibling device; a third transmitter configured to transmit third other-device registration information so as to make the third other-device registration information reach the child device, the third other-device registration information being information including an indication of having been retained as the child device; a second receiver configured to receive the first other-device registration information, the second other-device registration information, and the third other-device registration information respectively as first own-device registration information, second own-device registration information, and third own-device registration information, when the first other-device registration information, the second other-device registration information, and the third other-device registration information are transmitted from other devices so as to reach the own device; a fourth retainer configured to register and store each transmitting device being a source device of the first own-device registration information, as the child device; a fifth retainer configured to register and store each transmitting device being a source device of the second own-device registration information, as the sibling device; a sixth retainer configured to register and store each transmitting device being a source device of the third own-device registration information, as the parent device; and a broadcaster configured to broadcast a second hello packet being a hello packet including, as information, at least an identifier of the own device and the own-device hierarchical number.

That is, in this communication device, based on the hierarchical number that each device has, which indicates the number of hops necessary for the device to communicate with the root device located at the highest level of the hierarchical structure, the parent device whose hierarchical number is smaller than the hierarchical number of the own device by one, the sibling device whose hierarchical number is the same as that of the own device, and the child device whose hierarchical number is larger than that of the own device by one are registered and stored. Since the hierarchical numbers of the transmitting devices are notified by means of broadcast, the number of these devices having the hierarchical numbers that can be delivered by means of the broadcast, especially the number of the parent devices is not limited to one. Therefore, even if a situation occurs where the connection of this communication device with a certain parent device is lost, data transmission to the root device via another parent device is possible. Consequently, it is possible to improve efficiency of communication to the root device located at the highest level of the hierarchical structure.

Effect of the Invention

According to the present invention, it is possible to provide a communication device forming a network with a hierarchical structure and a communication method, the communication device and the communication method being capable of improving efficiency of communication to a root device located at the highest level of the hierarchical structure.

BRIEF DESCRIPTION OF THE DRAWINGS

FIG. 1 is a functional block diagram illustrating the structure of a communication device being one embodiment.

FIG. 2 is a geographical device arrangement chart and a table presenting registration information in the devices, which explain an operation in the network where the communication device illustrated in FIG. 1 is deployed in plurality.

FIG. 3A is a geographical device arrangement chart and a table presenting registration information in each device, which explain an operation on the next stage of that illustrated in FIG. 2 in the network where the communication device illustrated in FIG. 1 is deployed in plurality (No. 1).

FIG. 3B is a geographical device arrangement chart and a table presenting registration information in the devices, which explain an operation on the next stage of that illustrated in FIG. 2 in the network where the communication device illustrated in FIG. 1 is deployed in plurality (No. 2).

FIG. 4A is a geographical device arrangement chart and a table presenting registration information in the devices, which explain an operation on the next stage of that illustrated in FIG. 3B in the network where the communication device illustrated in FIG. 1 is deployed in plurality (No. 1).

FIG. 4B is a geographical device arrangement chart and a table presenting registration information in the devices, which explain an operation on the next stage of that illustrated in FIG. 3B in the network where the communication device illustrated in FIG. 1 is deployed in plurality (No. 2).

FIG. 7D is a table showing a change of the registration information in the devices in the new hierarchical structure illustrated in FIG. 7C.

FIG. 8D is a table showing a change of the registration information in the devices in the new hierarchical structure illustrated in FIG. 8C.

MODE FOR CARRYING OUT THE INVENTION

Figure 5:
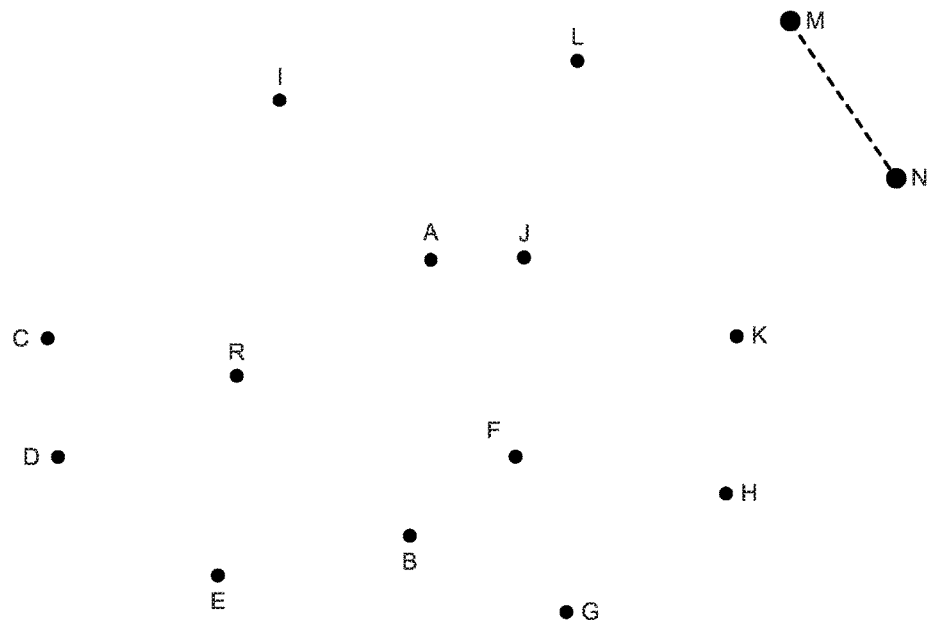
FIG. 5 is a geographical device arrangement chart and a table presenting registration information in the devices, which explain an operation on the next stage of that illustrated in FIG. 4B in the network where the communication device illustrated in FIG. 1 is deployed in plurality.

As a mode for carrying out the present invention, the communication device may further include: a performer configured to perform first determination on whether or not all of devices being retained as the parent device have got into an out-of-range state; a first updater configured, when a result of the first determination is true, to newly register and store each device being retained as the sibling device, as the parent device; and a second updater configured to newly set the own-device hierarchical number to a value larger by one than a hierarchical number of a device newly retained as the parent device.

This is a configuration for coping with a case where connection has been lost with all of the parent devices which can exist in plurality. In this case, the devices registered and stored as the sibling devices are newly registered and stored as new parent devices. Consequently, even when the connection is lost with all of the parent devices, data transmission to the root device is immediately enabled as before via the new parent device which has been the sibling device so far.

As another mode, the communication device may further include: a second performer configured to perform second determination on whether or not one or more new hello packets exist in the first hello packet collected, the one or more new hello packets each including: an identifier different from all of identifiers of devices being retained as the parent device, the sibling device, and the child device; and a hierarchical number smaller than the own-device hierarchical number by two or more; and a third updater configured, when a result of the second determination is true, to newly set the own-device hierarchical number to a value obtained by adding one to a smallest number of hierarchical numbers included in the one or more new hello packets.

This is a configuration for rationally coping with a case where a new device comes to exist in a range where its information is receivable by means of broadcast to the own device. In this case, the own-device hierarchical number is newly set to the value obtained by adding one to the number that is smaller than the own-device hierarchical number by two or more and is the smallest out of the hierarchical numbers included in the new hello packets, and consequently, this new device is registered as the parent device (one of the parent devices).

As another mode, the communication device may further include: an obtainer configured to obtain information regarding connection quality between the own device and each device being retained as the parent device, over the each device; a seventh retainer to register and store pieces of the information regarding the connection quality in association with the each device being retained as the parent device; and a selector and a forwarder configured to select one or more devices ranked higher in terms of connection quality, out of the each device being retained as the parent device, based on the information regarding the connection quality, and to forward a frame being to reach the root device from the own device, so as to make the frame relayed by the one or more devices ranked higher.

This is a configuration for setting which parent device out of the plural parent devices of the own device is to be actually used for the data transmission to the root device. It is generally thought that there is a difference among the connection qualities with the parent devices. Here, one or more parent devices with the better qualities are selected out of the parent devices, and they are used for the data transmission to the root device. When only one is selected, the route of the data transmission to the root device becomes singled out to a device on an immediately higher level, and when two or more are selected, a plurality of routes are used in parallel or are selected in turn, as the route of the data transmission to the root device.

As another mode, the communication device may further include: a second obtainer configured to obtain first connection quality information and second connection quality information, the first connection quality information being information regarding connection quality between the own device and each device being retained as the parent device, and the second connection quality information being information regarding connection quality between the own device and each device being retained as the sibling device; an eighth retainer configured to register and store pieces of the first connection quality information and the second connection quality information in association with the each device being retained as the parent device or the sibling device; and a second selector and a second forwarder configured to select one or more devices ranked higher in terms of connection quality, out of the each device being retained as the parent device or the sibling device, based on the first connection quality information and the second connection quality information, and to forward a frame being to reach the root device from the own device so as to make the frame relayed by the one or more devices ranked higher.

This mode is a mode intended to make use of the sibling devices besides the parent devices for data transmission to the root device. That is, one or more parent devices or sibling devices which are higher in terms of the quality are selected out of the plural parent devices and sibling devices of the own device, and they are used for data transmission to the root device. The use of the sibling devices increases the number of options of transmission routes, which is thought to enable more reliable data transmission.

As another mode, the communication device may further include: a second obtainer configured to obtain first connection quality information and second connection quality information, the first connection quality information being information regarding connection quality between the own device and each device being retained as the parent device, and the second connection quality information being information regarding connection quality between the own device and each device being retained as the sibling device; an eighth retainer configured to register and store pieces of the first connection quality information and the second connection quality information in association with the each device being retained as the parent device or the sibling device; a third performer configured, based on the first connection quality information, to perform third determination on whether or not connection quality in the each device being retained as the parent device satisfies a predetermined necessary threshold value; a third selector and a third forwarder configured, when at least one result of the third determination about the each device being retained as the parent devices is true, to select one device ranked highest in terms of the connection quality, out of the each device being retained as the parent device, and to forward a frame being to reach the root device from the own device so as to make the frame relayed by the one device ranked highest; and a fourth selector and a fourth forwarder configured, when all of results of the third determination about the each device being retained as the parent device are false, to select another one device ranked highest in terms of the connection quality, out of the each device being retained as the sibling device, based on the second connection quality information, and to forward the frame being to reach the root device from the own device so as to make the frame relayed by the other one device ranked highest.

This mode is also a mode intended to make use of the sibling device as well for the data transmission to the root device, similarly to the above-described mode. A difference lies in that, in this mode, the parent devices and the sibling devices are not regarded as being of the same priority, but the parent device is given a higher priority in the selection. The sibling devices are hierarchically located at the same position as the own device, and giving a priority to the parent device is thought to be rational in the context of the data transmission to the root device.

Based on the above, embodiments of the present invention will be hereinafter described with reference to the drawings. FIG. 1 is a functional block diagram illustrating the structure of a communication device being one embodiment. As illustrated in this drawing, this communication device has a hello packet receiving unit 11, an own-device hierarchical number setting unit (an update setting unit, a new parent candidate presence determining unit) 12, an own-device hierarchical number storing unit 12a; a parent device/sibling device/child device registering and storing unit (an update registering and storing unit) 13, an other-device registration information transmitting unit 14, an own-device registration information receiving unit 15, a hello packet transmitting unit 16, an information forwarding and receiving unit 21, a forwarded and received information processing unit 22, and a connection state determining unit 23.

In the description below, these functional blocks are sometimes abbreviated as follows for convenience of the description. That is, they are a receiving unit 11, a setting unit (in some case, an update setting unit or a determining unit) 12, a storing unit 12a, a registering and storing unit (in some case, an update registering and storing unit) 13, a transmitting unit 14, a receiving unit 15, a transmitting unit 16, a forwarding and receiving unit 21, a processing unit 22, and a determining unit 23. Further, hereinafter, besides FIG. 1 illustrating the functional block, FIG. 2 to FIG. 8D explaining its contents and operation will also be referred to when necessary.

Figure 6A:
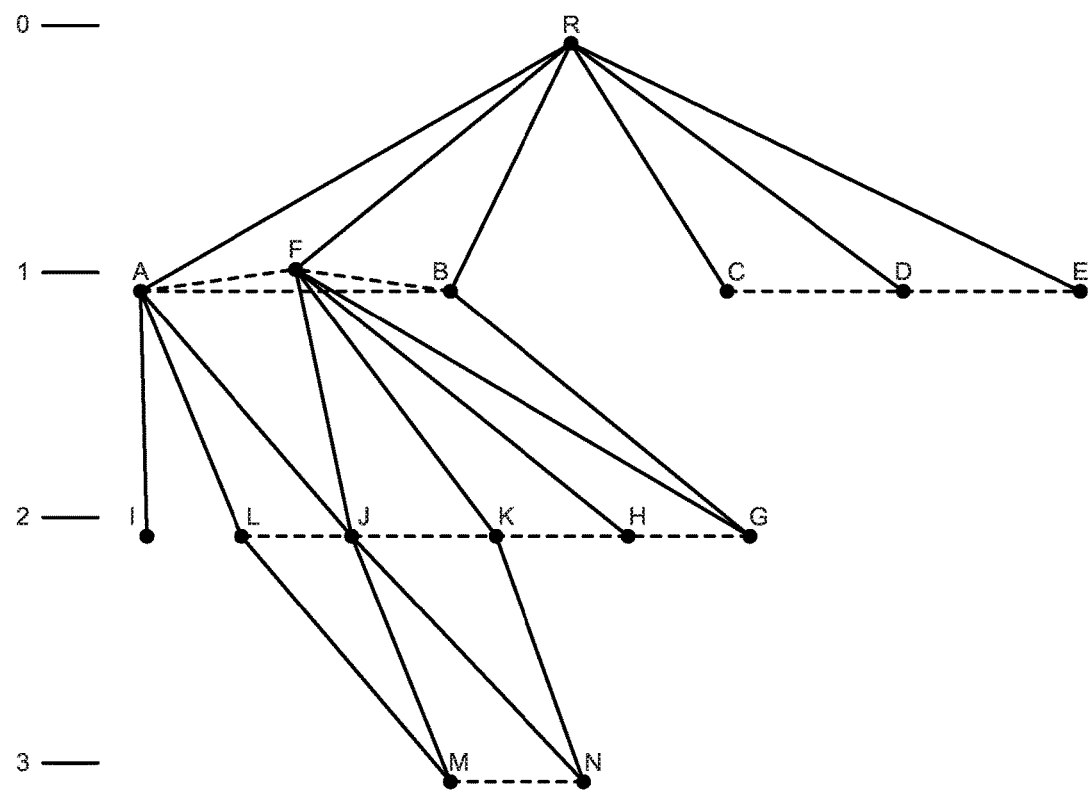
FIG. 6A is a device relation chart illustrating a hierarchical structure in the network where the communication device illustrated in FIG. 1 is deployed in plurality.

First, the application of this communication device to a network will be roughly described. FIG. 6A is a device relation chart illustrating a hierarchical structure in the network where the communication device illustrated in FIG. 1 is deployed in plurality. In FIG. 6A, the reference signs A to N denote the respective communication devices each having the configuration illustrated in FIG. 1, and the reference sign R denotes a root device. In network communication through this hierarchical structure, thus arranged as a tree structure are the devices A to N that may have a plurality of parent devices, with the root device R being at the highest level. A method of constructing a parent-child relation between such hierarchical levels will be described later. Information frame (data) that is to reach the root device R is transmitted as a packet while being relayed (=while multihopping) from each of devices A to N and so on sequentially through devices being its parents (another example will be also described later). The devices A to N and so on are wireless sensor node devices, for instance.

Referring to FIG. 1, the hello packet receiving unit 11 receives a hello packet broadcast from a transmitting device. This hello packet includes, as information, at least an identifier of the transmitting device, a hierarchical number indicating the number of hops necessary for the transmitting device to communicate with the root device located at the highest level of the hierarchical structure. The hierarchical number is the number of parent-child hops necessary for each of the devices A to N to communicate with the root device R as illustrated in FIG. 6A. The device of interest, when existing at a position reachable by the aforesaid broadcast by another device, is capable of receiving this hello packet. The received identifier and hierarchical number of the transmitting device are sent from the hello packet receiving unit 11 to the own-device hierarchical number setting unit 12.

The setting unit 12 sets an own-device hierarchical number being a hierarchical number of the own device. For this purpose, it collects the identifier and the hierarchical number of the transmitting device regarding one or more transmitting devices, and sets the own-device hierarchical number to a value obtained by adding one to the smallest number of the hierarchical numbers of the one or more transmitting devices. Specifically, "the smallest number" is sometimes a number common to the plural transmitting devices. The set own-device hierarchical number is sent to the own-device hierarchical number storing unit 12a to be stored therein. Further, besides the set own-device hierarchical number, the collected identifiers and hierarchical numbers of the transmitting devices are given from the setting unit 12 to the registering and storing unit 13.

The registering and storing unit 13 performs the following operation based on the given identifiers and hierarchical numbers of the transmitting devices besides the aforesaid own-device hierarchical number. Specifically, the transmitting devices having the hierarchical numbers smaller than the own-device hierarchical number by one are registered and stored as parent devices, the transmitting devices having the same hierarchical numbers as the own-device hierarchical number are registered and stored as sibling devices, and the transmitting devices having the hierarchical numbers larger than the own-device hierarchical number by one or more are registered and stored as child devices. Here, by registering and storing all the transmitting devices having the hierarchical numbers larger than the own-device hierarchical number by one or "more" as the child devices, it is possible to avoid discrepancy finally occurring in their registration information and also to reduce the number of multihops during normal data transmission in the network.

An indication that the transmitting devices are registered and stored as the parent devices, the sibling devices, or the child devices is given from the registering and storing unit 13 to the other-device registration information transmitting unit 14. Then, the transmitting unit 14 transmits other-device registration information including the indication of the registering and storing as the parent devices so that the other-device registration information reaches the parent devices, transmits other-device registration information including the indication of the registering and storing as the sibling devices so that the other-device registration information reaches the sibling devices, and transmits other-device registration information including the indication of the registering and storing as the child devices so that the other-device registration information reaches the child devices.

The transmission of these pieces of information can be performed as multicast where multiple transmission destinations are designated (or unicast when the number of transmission destinations is one) or as broadcast where transmission destinations are not designated. In the case of broadcast, the transmitting unit 14 can be practically regarded as the same as the hello packet transmitting unit 16 (to be described next) and a common block can be provided for these units. That is, the broadcast may include the other-device registration information in addition to the own device identifier and the own-device hierarchical number.

The above series of flows is an operation triggered by the broadcast from another device. Here, the device of interest naturally can be a device on a broadcasting side on the contrary. Specifically, the hello packet transmitting unit 16 uses the own-device hierarchical number stored in the storing unit 12a to broadcast a hello packet including, as information, at least the own device identifier and the own-device hierarchical number. Then, in another device receiving the broadcast, the aforesaid series of operations takes place.

When the above series of operations take place in the other device, information indicating that the device of interest is registered and stored as a parent device, a sibling device, or a child device in the other device (hereinafter, own-device registration information) is generated in the other device, and this information is sent together with the identifier of the other device by multicast (or unicast or broadcast as in the above) so as to reach the device of interest. Then, its own-device registration information receiving unit 15 receives the own-device registration information. The received own-device registration information is given from the receiving unit 15 to the registering and storing unit 13. In a case where the receiving unit 15 receives a broadcast, the receiving unit 15 can be practically regarded as the same as the hello packet receiving unit 11, and a common block may be provided for these units.

The registering and storing unit 13 performs the following operation based on the own-device registration information given from the receiving unit 15. Specifically, it registers and stores, as child devices, transmitting devices being transmitting-ends of the own-device registration information indicating the registration as the parent device, registers and stores, as sibling devices, transmitting devices being transmitting ends of the own-device registration information indicating the registration as the sibling device, and registers and stores, as parent devices, transmitting devices being transmitting-ends of the own-device registration information indicating the registration as the child device. Generally, in this operation in the registering and storing unit 13, the already registered information is only confirmed again in some case, while, in other case, the already registered information is updated.

In either case, if a certain device registers another device as a child device (parent device), the resulting situation is that the other device registers the certain device as a parent device (child device). Further, if a certain device registers another device as a sibling device, the resulting situation is that the other device registers the certain device also as a sibling device.

The above-described operation is an operation for constructing a hierarchical structure like that illustrated in FIG. 6A in the network where the plural communication devices are deployed. That is, each of the devices in the network has the own-device hierarchical numbers set by the above-described operation, and are in a state where their parent devices, child devices, sibling devices are specified and registered.

That is, in each of the communication devices A to N illustrated in FIG. 6A, based on the device's hierarchical numbers indicating the number of parent-child hops necessary for the device to communicate with the root device R located at the highest level of the hierarchical structure, the parent devices whose hierarchical numbers are smaller than the own-device hierarchical number by one and the sibling devices whose hierarchical numbers are the same as this, the child devices whose hierarchical numbers are larger than this by one are registered and stored. Since the hierarchical numbers of the transmitting devices are notified by broadcast, the number of these devices having the hierarchical numbers that can be delivered by broadcast, especially the number of the parent devices is not generally limited to one.

Therefore, in general, even if there occurs a situation where the connection with some parent device is lost, a data transmission route to the root device R via another parent device is established. This can greatly reduce a recovery operation such as newly searching for a parent device, which can improve efficiency of communication with the root device R located at the highest level of the hierarchical structure.

The forwarding and receiving unit 21 is responsible for the regular transmission of data that is to reach the root device R. Specifically, data sent from a child device is received by the forwarding and receiving unit 21 and then this data is transmitted from the forwarding and receiving unit 21 toward a parent device. If data processing is required when the data is received and forwarded, the forwarded and received information processing unit 22 performs the processing, and when some information needs to be added, processing for this is also performed in the processing unit 22. Further, when new data is transmitted from this device, the processing unit 22 performs processing for this, and the data is transmitted from the forwarding and receiving unit 21 toward the parent device(s). For selecting the parent device (s) where to forward the data, information registered in the registering and storing unit 13 is referred to.

To be more specific, the parent device(s) where to forward the data can be decided based on determination by the connection state determining unit 23. The connection state determining unit 23 determines a connection state with each of the plural devices registered as possible parent devices. For example, in a case where one of two registered parent devices is in use as the parent device where to forward the data, when the connection with this parent device gets into a poor state, the determining unit 23 can determine the poor state based on a forwarding and receiving condition in the information forwarding and receiving unit 21. Then, the information forwarding and receiving unit 21 receiving an instruction based on the determination by the determining unit 23 can make a change so that the other one of the parent devices is used as a new parent device where to forward the data.

The information forwarding and receiving unit 21 may be operated so as to constantly use multiple parent devices in parallel. It is thought that this improves reliability of the transmission since the data transmission up to the root device R is performed through multiple routes. In this case, if all the parent devices are used, data transmission may take place through an explosively large number of routes depending on their number, and communication traffic may become crowded. Therefore, the setting may be made so as to use a limited number of the parent devices instead of using all the parent devices without any limit. It can be easily understood that, when several parent devices are used in parallel, it is advantageous to transmit data to the parent devices in turn according to the connection state determining unit 23.

FIG. 2 is a device arrangement chart and a table presenting registration information in the devices, which explain an operation in the network where the communication device illustrated in FIG. 1 is deployed in plurality. Hereinafter, with reference to FIG. 2 and the following drawings, will be given a description of the setting of the own-device hierarchical number performed in the devices A to N and the registration and storage of their parent devices, child devices, and sibling devices, in the exemplified deployment of the devices A to N.

As illustrated in the upper side in FIG. 2, it is assumed that the devices A to N and the root device R are geographically arranged. First, at the initial state, it is assumed that the own-device hierarchical numbers are not set in the respective devices A to N. The hierarchical number of the root device R is always zero (that is, the number of hops necessary for communication up to the root device R is zero since the root device R is itself), and the root device R is capable of broadcasting, as a hello packet, information including its identifier R and own-device hierarchical number 0.

Then, the devices A, B, C, D, E, F existing in a range where they can receive the broadcast by the root device R receive the information through their hello packet receiving units 11 and set their own-device hierarchical numbers by their setting units 12 based on the information. In this case, the own-device hierarchical numbers of the devices A, B, C, D, E, F become 1 which is a value obtained by adding 1 to 0 (the hierarchical number of the root device) (also refer to the table in FIG. 2; circled 1). Then, their registering and storing units 13 register and store the root device R as a parent device (ditto; circled 2).

Next, in the devices A, B, C, D, E, F, their transmitting units 14 transmit (unicast), along with identifiers of the own devices, the other-device registration information including an indication of the registration as the parent device so that the other-device registration information reaches the root device R. In the root device R receiving these pieces of information, the devices A, B, C, D, E, F are registered as child devices (ditto; circled 3). Incidentally, the devices A, B, C, D, E, F may transmit the information indicating that the root device R is registered as the parent device, by means of broadcast transmission of hello packets (this has already been described). Hereinafter, in the drawings, a description will be given on assumption that the transmission of the other-device registration information is always done by multi/unicast as an example, but it should be noted that this can be done by means of broadcast of a hello packet instead.

Next, FIG. 3A is a geographical device arrangement chart and a table presenting registration information in each of the devices, which explain an operation on the next stage of that illustrated in FIG. 2 in the network where the communication device illustrated in FIG. 1 is deployed in plurality (No. 1). Since the hierarchical numbers of the devices A, B, C, D, E, F are set as 1 as described above, it is possible to broadcast information including their identifiers and hierarchical numbers=1 in hello packets.

Then, the devices A, B, C, D, E, F existing in a range where they can receive broadcast from any of the devices A, B, C, D, E, F receive the information through their hello packet receiving units 11, and are informed by the received broadcast that all the hierarchical numbers are 1 (that is, the same as the own-device hierarchical number). Consequently, in this case, in the devices A, B, C, D, E, F, the transmitting devices of the broadcasts are registered and stored as sibling devices (also refer to the table in FIG. 3A; circled 1). Note that, in the depiction in FIG. 3A, it is assumed that the device A is capable of receiving the broadcasts from the devices B, F, the device B is capable of receiving the broadcasts from the devices A, F, the device C is capable of receiving the broadcast from the devices D, the device D is capable of receiving the broadcasts from the devices C, E, the device E is capable of receiving the broadcast from the device D, and the device F is capable of receiving the broadcasts from the devices A, B.

Next, the transmitting units 14 of the devices A, B, C, D, E, F transmit (multi/unicast), along with the identifiers of the own devices, the other-device registration information indicating the registration as the sibling devices so that the other-device registration information reaches the devices registered as the sibling devices. The devices A, B, C, D, E, F receiving this information through their receiving units 15 only confirm this since (one or more of) the devices A, B, C, D, E, F have already been registered as the sibling devices.

Next, FIG. 3B is a geographical device arrangement chart and a table presenting registration information in each of the device, which explain an operation on the next stage of that illustrated in FIG. 2 in the network where the communication device illustrated in FIG. 1 is deployed in plurality (No. 2). The operation described with reference to FIG. 3B actually takes place at the same stage as the operation described with reference to FIG. 3A, but is illustrated separately for convenience of the description.

When the devices A, B, C, D, E, F broadcast the information including their identifiers and hierarchical numbers=1 in hello packets as described above, for example, the broadcasts reach devices I, J, L from the device A, the broadcast reaches a device G from the device B, and the broadcast reaches the devices G, H, J, K from the device F as illustrated in the upper side of FIG. 3B, besides the devices described in FIG. 3A. Incidentally, it is assumed that, as for the devices C, D, E, except those receiving their broadcasts described in FIG. 3A, there exists no device capable of receiving their broadcasts.

As a result of the broadcasts from the devices A, B, C, D, E, F, the devices G, H, I, J, K, L existing in a range where they can receive one or more of these broadcasts receive the broadcasts through their hello packet receiving units 11, and set their own-device hierarchical numbers by their setting units 12 based on the broadcast information. In this case, since the notified hierarchical numbers of the devices A, B, F being the transmitting sources are all 1, 1 is added to 1, so that the own-device hierarchical numbers become 2 (also refer to the table in FIG. 3B; circled 1). Then, the registering and storing units 13 register and store the devices which have sent the identifiers by the broadcasts, out of the devices A, F, B, as the parent devices (ditto; circled 2).

Next, the transmitting units 14 of the devices G, H, I, J, K, L transmit (multi/unicast), along with the identifiers of the own devices, the other-device registration information indicating the registration as the parent device so that the other-device registration information reaches the devices registered and stored as the parent devices out of the devices A, B, F. In the devices A, B, F receiving this information, the devices that have sent the identifiers by multi/unicast out of the devices A, B, C, D, E, F are registered as child devices (ditto; circled 3).

Next, FIG. 4A is a geographical device arrangement chart and a table presenting registration information in each of the devices, which explain an operation on the next stage of that illustrated in FIG. 3B in the network where the communication device illustrated in FIG. 1 is deployed in plurality (No. 1). Referring to what is described with reference to FIG. 3A can lead to easy understanding of the operation to be described with reference to FIG. 4A. As a result, in this case, the device G registers and stores the device H, the device H registers and stores the devices G, K, the device J registers and stores the devices K, L, the device K registers and stores the devices J, H, and the device L registers and stores the device J, as sibling devices.

Next, FIG. 4B is a geographical device arrangement chart and a table presenting registration information in each of the devices, which explain an operation on the next stage of that illustrated in FIG. 3B in the network where the communication device illustrated in FIG. 1 is deployed in plurality (No. 2). Referring to what is described with reference to FIG. 3B can lead to easy understanding of the operation to be described with reference to FIG. 4B. The operation to be described with reference to FIG. 4B actually takes place at the same stage as the operation described with reference to FIG. 4A, but is illustrated separately for convenience of the description.

As a result, in this case, devices M, N set their own-device hierarchical numbers to 3, the device M registers and stores the devices J, L as parent devices, the device N registers the devices J, K as parent devices, the device J registers and stores the devices M, N as child devices, the device K registers and stores the device N as a child device, and the device L registers and stores the device M as a child device.

Next, FIG. 5 is a device arrangement chart and a table presenting registration information in each of the devices, which explain an operation on the next stage of that illustrated in FIG. 4B in the network where the communication device illustrated in FIG. 1 is deployed in plurality. Referring to what is described with reference to FIG. 3A and FIG. 4A can lead to easy understanding of the operation to be described with reference to FIG. 5. As a result, in this case, the device M registers and stores the device N, and the device N registers and stores the device M, as sibling devices. Incidentally, since, in this device deployment, there exists no device that registers and stores the devices M, N as parent devices, an operation for this does not take place in this case.

The above-described series of operations brings about a state where, in the devices A to N (and the root device R), pieces of the registration information of the parent devices, the sibling devices, and the child devices are generated, and they are registered and stored, as illustrated in the table in the lower side of FIG. 5. A hierarchical structure (parent-child relations) and sibling relations among the devices A to N (and the root device R) based on the table in the lower side in FIG. 5 are as illustrated in FIG. 6A. Further, parent-child relations and sibling relations among the devices A to N (and the root device R) in their geographical relation are as illustrated in FIG. 6B.

In the above, the operation of constructing the hierarchical structure of the network, with the broadcast by the root device R being the initial operation, is described. In addition, even after the hierarchical structure is thus constructed, the devices A to N periodically broadcast their identifiers and hierarchical numbers (the broadcast may include the other-device registration information, as previously described). Consequently, the operation in accordance with this takes place in the other devices A to N. If there is no change in a network connection environment, there occurs no change in the registration information in the devices A to N, and the hierarchical structure of these devices is maintained as it is. However, depending on the case, the registration information is sometimes changed, resulting in a change in the hierarchical structure, as will be described below.

Figure 6B:
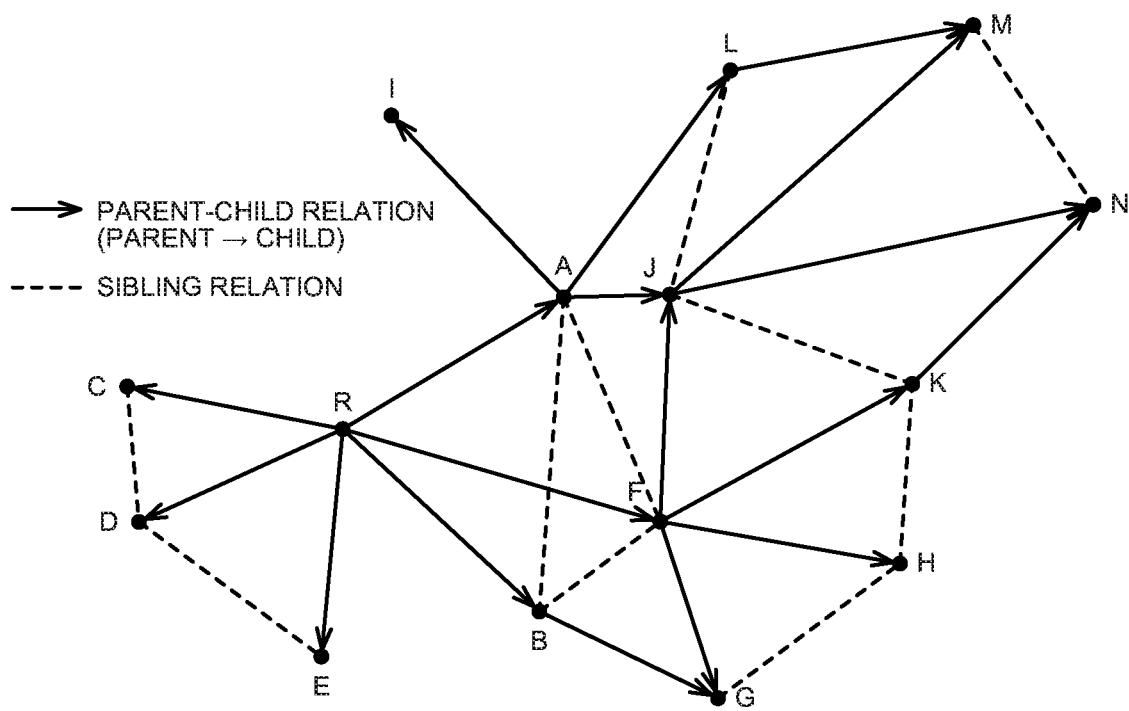
FIG. 6B is a relation chart illustrating a geographical arrangement relation among the devices having the hierarchical structure illustrated in FIG. 6A.
Figure 7A:
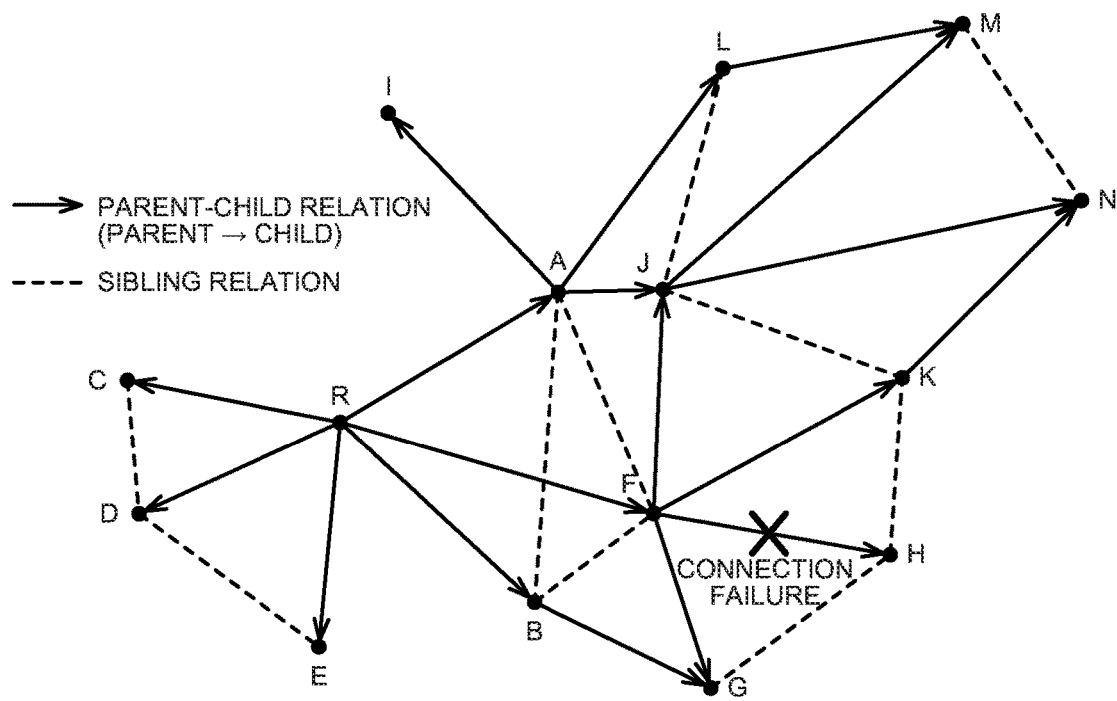
FIG. 7A is a relation chart illustrating an example of a connection failure occurring in the geographical arrangement relation illustrated in FIG. 6B.

Here, as an example of the case where the hierarchical structure changes, it will be next described, with reference to FIG. 7A to FIG. 7D, by what operation a network structure is changed (corrected) due to a connection failure, as an example, that has occurred in the hierarchical structure of the devices illustrated in FIG. 6B. FIG. 7A is a relation chart illustrating an example of the connection failure that has occurred in the arrangement relation illustrated in FIG. 6B. In this example, it is assumed that the connection failure has occurred in a parent-child relation between the device F and the device H, as illustrated in FIG. 7A.

Figure 7B:
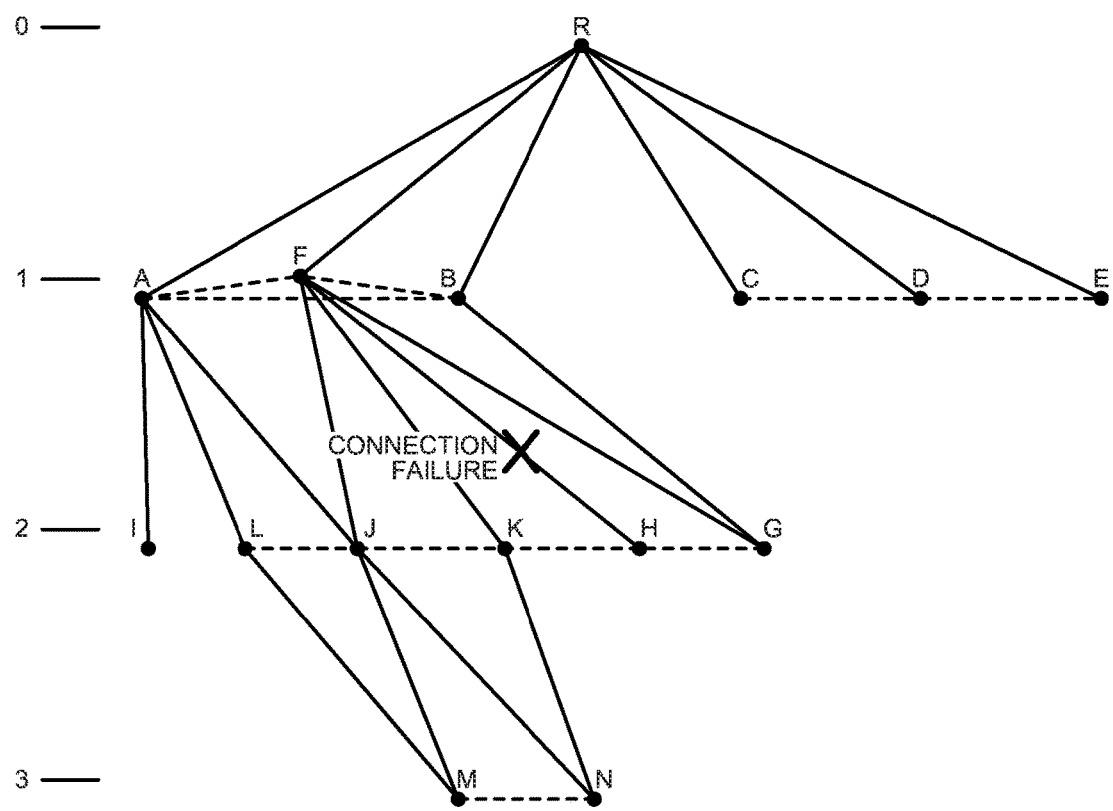
FIG. 7B is a relation chart illustrating the connection failure illustrated in FIG. 7A, in the hierarchical structure in the network.
Figure 7C:
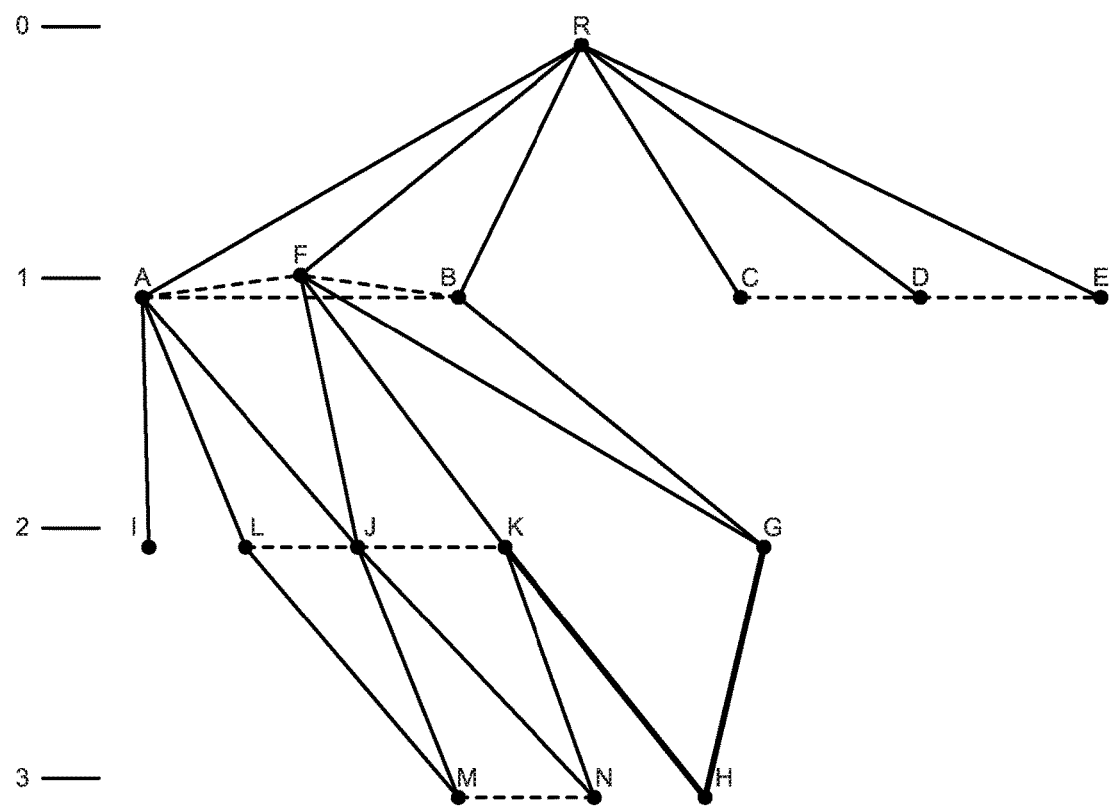
FIG. 7C is a device relation chart illustrating a new hierarchical structure constructed in the network after the connection failure illustrated in FIG. 7B.

A hierarchical relation among the devices corresponding to the geographical arrangement relation illustrated in FIG. 7A is as illustrated in FIG. 7B. When such a connection failure occurs, this network is autonomously changed to a network having a hierarchical relation illustrated next in FIG. 7C. Such a change is mostly understandable from what has already been described, but will be briefly described below.

When the connection failure illustrated in FIG. 7B occurs, the device H becomes unable to receive a broadcast from the device F whose hierarchical number is 1. The device H can receive broadcasts only from the devices G, K, and the hierarchical numbers of the devices G, K are 2. Accordingly, the own-device hierarchical number setting unit 12 of the device H updates the hierarchical number of the own device to 3 which is a number obtained by adding 1 to 2. Then, the devices G, K having the hierarchical number=2 which is smaller than the own-device hierarchical number 3 by 1 are updated as parent devices (in place of the sibling devices). The parent device registration of the device F being the original parent device is deleted. This is a description of a change in the device H (also refer to FIG. 7D).

In accordance with the above change in the device H, the devices G, K receive a multicast from the transmitting unit 14 of the device H by the receiving units 15 of the own devices G, K, and are informed that they have been registered as the parent devices of the device H. Consequently, in the devices G, K, their update registering and storing units 13 newly register the device H as a child device (instead of the sibling device). This is a description of a change in the devices G, K (also refer to FIG. 7D). Incidentally, in the device F, as a response to its broadcast, since there occurs no unicast from the device H (or since the broadcast from the device H cannot be received), the registration of the device H as the child device is deleted (also refer to FIG. 7D).

As described above, in this network, at least the following operation is performed. That is, it is determined whether or not there has occurred a state where the connection with any of the devices registered and stored as the parent device is not possible, and when a result of this determination is true, devices registered and stored as sibling devices are registered and stored as new parent devices, and the own-device hierarchical number is updated to a value larger than the hierarchical numbers of the newly registered parent devices by one.

Consequently, it is possible to cope with the case where the connection with all of the parent devices that can be generally plural is lost. That is, even when the connection with all of the parent devices is lost, it is possible to perform data transmission to the root device as before, immediately via the new parent device which was formerly the sibling device.

Figure 8A:
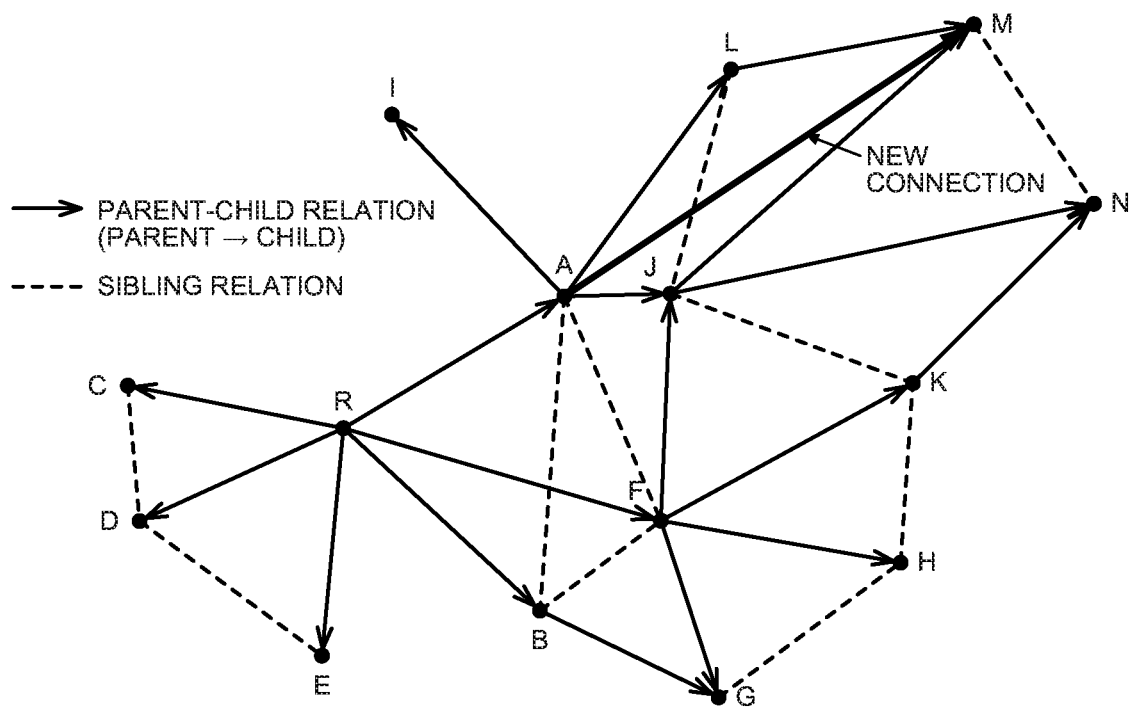
FIG. 8A is a relation chart illustrating an example of new connection occurring in the geographical arrangement relation illustrated in FIG. 6B.

Next, as another example of the case where the hierarchical structure changes, a change (correction) of a network structure due to new connection, as an example, occurring in the geographical relation illustrated in FIG. 6B will be described with reference to FIG. 8A to FIG. 8D. FIG. 8A is a relation chart illustrating an example of the new connection occurring in the geographical arrangement relation illustrated in FIG. 6B. In this example, it is assumed that a new parent-child relation occurs between the device A and the device M as illustrated in FIG. 8A.

Figure 8B:
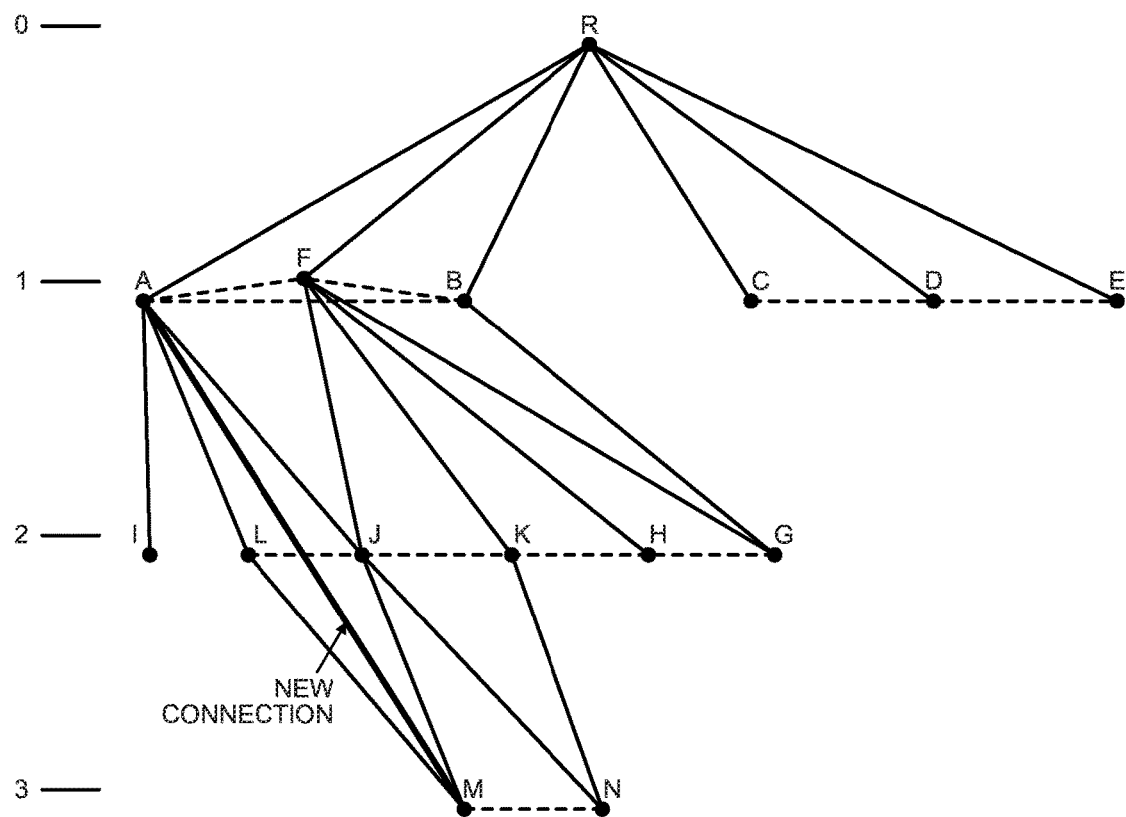
FIG. 8B is a relation chart illustrating the new connection illustrated in FIG. 8A, in the hierarchical structure in the network.
Figure 8C:
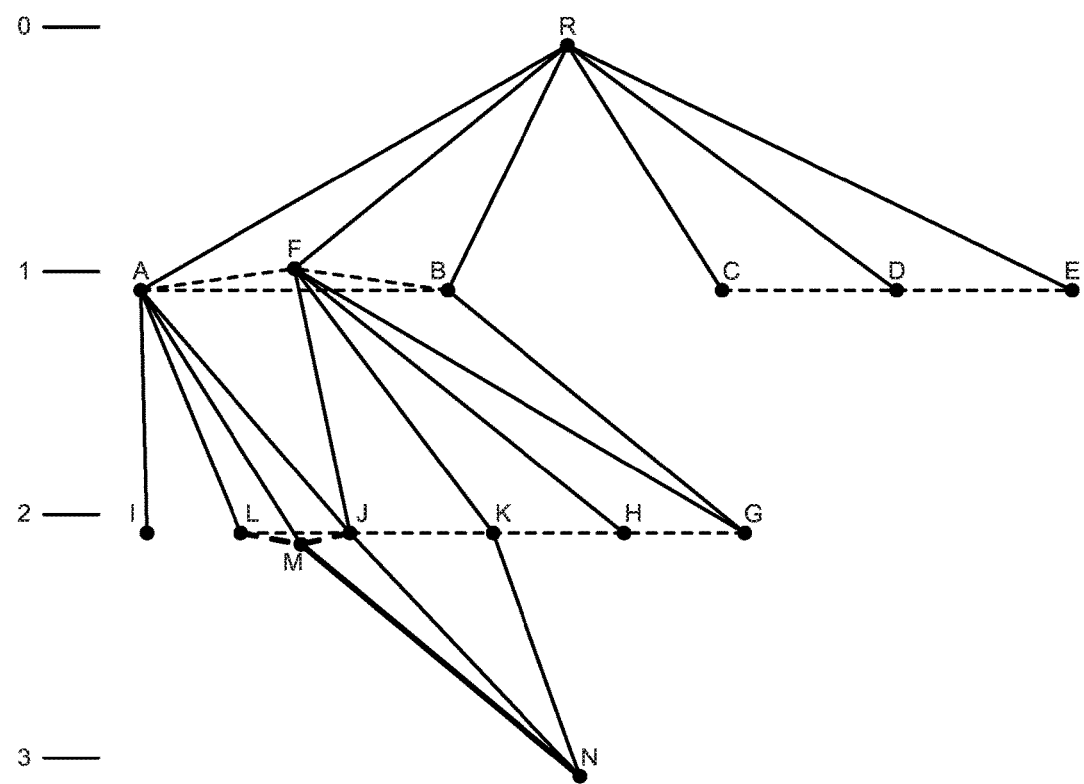
FIG. 8C is a device relation chart illustrating a new hierarchical structure constructed in the network after the new connection illustrated in FIG. 8B.

A hierarchical relation among the devices corresponding to the geographical arrangement relation illustrated in FIG. 8A is as illustrated in FIG. 8B. When such new connection occurs, this network is autonomously changed to a network having the hierarchical relation illustrated next in FIG. 8C. Such a change is mostly understandable from what has already been described, but will be briefly described.

When the new connection occurs as illustrated in FIG. 8B, the device M receives a broadcast from the device A, and determines, in its new parent candidate presence determining unit 12, that there exists a device that is to be a new parent device. This is because, at this point in time, the own-device hierarchical number=3, and as for the registered devices, parent devices are the devices J, L, a sibling device is the device N, and there is no child device, and a hierarchical number of the device A which is a completely new device is 1 (smaller than the own-device hierarchical number 3 by 2).

Then, the update registering unit 13 of the device M updates the own-device hierarchical number to 2 which is the number obtained by adding 1 to 1 being the hierarchical number of the device A. Further, the update registering unit 13 of the device M newly registers the device A as a parent device, and the devices J, L which have been registered as the parent devices are updated as sibling devices based on their hierarchical numbers. Further, the device N which has been registered as the sibling device so far is updated as a child device based on its hierarchical number. This is a description of a change in the device M (also refer to FIG. 8D).

The change of the registration information in the device M is unicast from its transmitting unit 14 to the receiving unit 15 of the device A, so that the device A is informed that the own device is newly registered as the parent device of the device M. In the device A, the device M is additionally registered as a new child device by its update registering and storing unit 13. This is a description of a change in the device A (also refer to FIG. 8D).

Further, the device M broadcasts its identifier and its new hierarchical number by its transmitting unit 16. Consequently, the devices J, L update the device M as a sibling device (instead of the child device) based on the notified hierarchical number. Further, the device N updates the device M as a parent device (in place of the sibling device) based on the notified hierarchical number. This is a description of a change in the devices J, K, N (also refer to FIG. 8D).

As described above, in this network, at least the following operation is performed. That is, it is determined whether or not the hello packets include one or more new hello packets each including: an identifier that is different from all of the identifiers of the devices registered and stored as the parent devices, the sibling devices, or the child devices; and a hierarchical number that is smaller by two or more than the own-device hierarchical number. When a result of this determination is true, the own-device hierarchical number is updated to a value obtained by adding 1 to the smallest number of the hierarchical numbers included in the new hello packets.

Consequently, it is possible to rationally cope with a case where a new device comes to exist in a range where its information is receivable by broadcast to the own device. That is, this new device is registered as a parent device (one of parent devices). In particular, according to the change (FIG. 8C) of the network structure described as an example, since the change is made so that the hierarchical number of the device M becomes smaller, efficiency of data transmission to the root device R via the device M uniformly improves.

Incidentally, in a case where a completely new device newly joins the range where it can receive a broadcast by each of the devices of the network, a similar operation to that described above also takes place in this new device and the other devices in the network, so that the prior network structure is changed.

Figure 9:
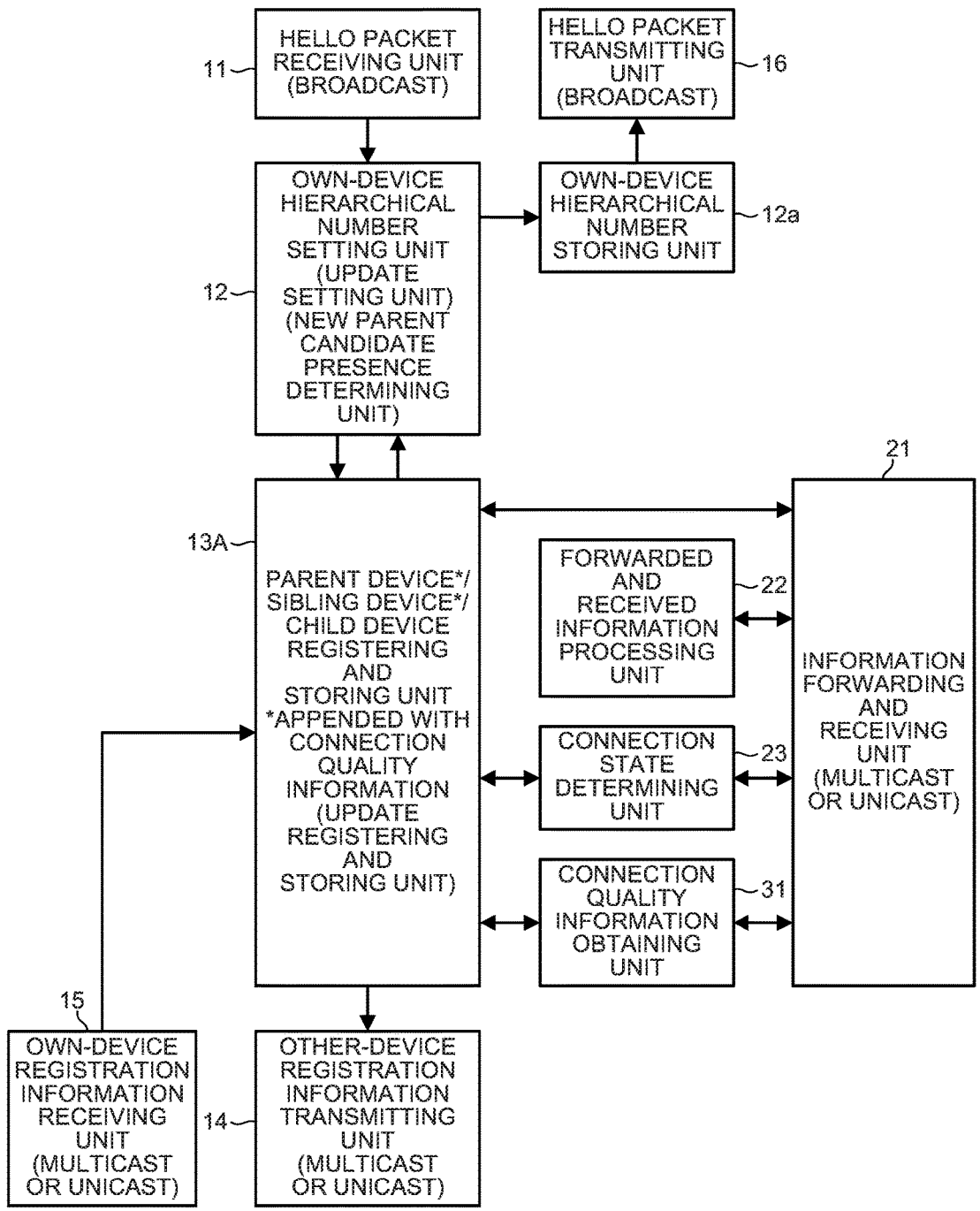
FIG. 9 is a functional block diagram illustrating the structure of a communication device being another embodiment.

Next, a communication device being another embodiment will be described with reference to FIG. 9. FIG. 9 is a functional block diagram illustrating the structure of the communication device being the other embodiment. In this drawing, the same blocks as those illustrated in FIG. 1 are denoted by the same reference signs, and a description thereof will be omitted unless other matter needs to be additionally described.

In this embodiment, as a function of a registering and storing unit 13A, pieces of information regarding connection qualities with at least parent devices and in addition, sibling devices are registered and stored in association with these devices. Such association is made based on information given by a connection quality information obtaining unit 31.

Through actual communication with at least the parent devices and in addition, the sibling devices (in some case, further child devices), the connection quality information obtaining unit 31 obtains the information regarding the connection quality with each of them by making use of the information forwarding and receiving unit 21. More specifically, for example, test signals are exchanged, and information about a return frequency of acknowledge signals, a transmission success frequency of test packets, an error rate, and so on is obtained. Communication being actual data transmission can also be made use of, instead of the exchange of the test signals.

The pieces of obtained information regarding the connection quality are sent to the registering and storing unit 13A and are stored in association with the corresponding parent devices, sibling devices, and child devices. Such association is preferably periodically updated so that a current status of the network is constantly reflected. Incidentally, in a case where the information regarding the connection quality with the child device is also obtained, it is possible to use this information immediately when the child device is newly registered as a sibling device, which contributes to a smooth change of the hierarchical structure of the network.

In a case where the communication devices illustrated in FIG. 9 are arranged in a network, it is conceivable to first put the devices into the following operation. Specifically, based on the pieces of information regarding the connection quality, one or more devices which are ranked higher in terms of the connection quality are selected out of the devices registered and stored as the parent devices, and thereafter information (data) that is to reach a root device from the own device is forwarded so as to be relayed by the one or more devices.

This is because using a parent device whose connection quality is higher is more advantageous for the data transmission. This is a mode where one or more parent devices are selected in order of the quality and they are used for the data transmission to the root device. Here, when only one device is selected, a route of the data transmission to the root device is brought down to a single device on an immediately higher level, and when two or more devices are selected, multiple routes are used in parallel as the route of the data transmission to the root device. The merits and points to be careful about when the multiple parent devices are used in parallel are as previously described.

Figure 10:
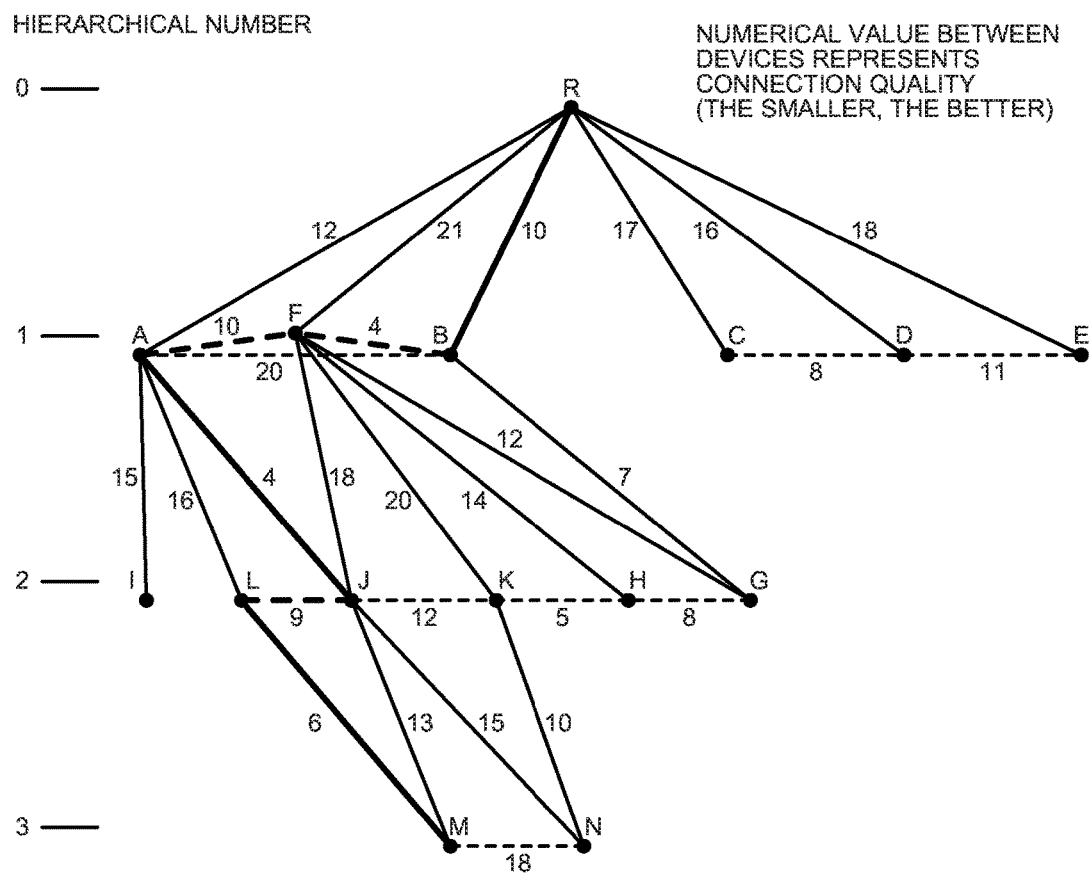
FIG. 10 is an explanatory chart illustrating an example of a data transmission route which is selected by making use of connection quality information, in a network where the communication device illustrated in FIG. 9 is deployed in plurality (in a case where the best one is selected out of parent devices and sibling devices).

Next, FIG. 10 is an explanatory chart illustrating an example of a data transmission route which is selected by making use of the connection quality information, in the network where the communication device illustrated in FIG. 9 is deployed in plurality. In FIG. 10, the numerical values between the devices each represent the connection quality expressed as the numerical value, and in this case, the smaller the numerical value, the higher the quality. This example illustrates a case where, when the data transmission is performed from some device toward the root device R, the best one among its parent devices and in addition its sibling devices is selected for the relaying. As an example, the data transmission from the device M is illustrated.

Specifically, based on the information regarding the connection qualities with the devices J, L being the parent devices of the device M and the information regarding the connection quality with the device N being its sibling device, the device L which is ranked the highest in terms of the connection quality is selected out of the devices J, L, N, and thereafter data that is to reach the root device R from the device M is forwarded so that this device L relays the data. Similarly, in the device L, based on the information regarding the connection quality with the device A being its parent device and the information regarding the connection quality with the device J being its sibling device, the device J which is ranked the highest in terms of the connection quality is selected out of the devices A, J, and then, the data is forwarded so that this device J relays the data. Thereafter, the data transmission from the device J to the device A, from the device A to the device F, from the device F to the device B, and from the device B to the root device R is also performed in the same manner.

That is, this mode is a mode intended to make use of not only the parent devices but also the sibling devices for the data transmission to the root device. More generally, out of multiple parent devices and sibling devices of the own device, one or more parent devices or sibling devices may be selected in order of the quality, and they may be used for the data transmission to the root device. It is thought that the use of the sibling devices increases options of the transmission route to enable more reliable data transmission.

Incidentally, in this mode, the sibling devices are also made use of for the data transmission, and consequently, in a case where the sibling devices are connected to each other so as to form a loop, there is generally a possibility that the data transmission stays in the loop and the data is not transmitted to the parent device. To avoid this, for example, when data once forwarded to the sibling device is sent back from another sibling terminal, this is detected, and a device used for the data transmission is selected out of other parent devices and sibling terminals, with the sibling terminal to which the data has once been forwarded being excluded from candidates.

Figure 11:
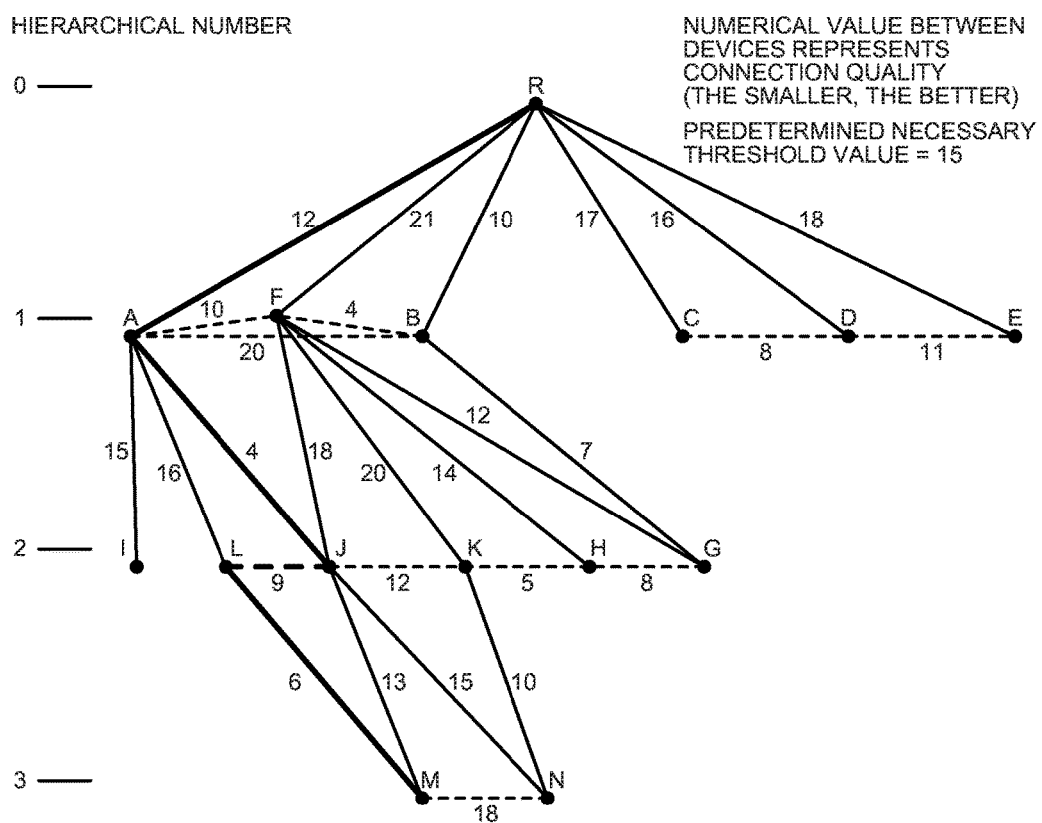
FIG. 11 is an explanatory chart illustrating an example of another data transmission route which is selected by making use of the connection quality information, in the network where the communication device illustrated in FIG. 9 is deployed in plurality (in a case where the best one is selected while a parent device having predetermined connection quality or higher is given a priority over a sibling device).

Next, FIG. 11 is an explanatory chart illustrating an example of another data transmission route which is selected by making use of the connection quality information, in the network where the communication device illustrated in FIG. 9 is deployed in plurality. In FIG. 11, the numerical values between the devices each mean the connection quality as described with reference to FIG. 10. This example illustrates a case where, when data is transmitted from some device toward the root device, the best device is selected while a parent device having a predetermined level of connection quality or higher is given a priority over sibling devices. As an example, the data transmission from the device M is illustrated.

Specifically, based on the information regarding the connection qualities with the devices J, L being the parent devices of the device M and the information regarding the connection quality with the device N being its sibling device, the device L which is ranked the highest in terms of the connection quality is first selected out of the devices J, L, N, and thereafter data that is to reach the root device R from the device M is forwarded so that this device L relays the data. Similarly, in the device L, based on the information regarding the connection quality with the device A being its parent device and the information regarding the connection quality with the device J being its sibling device, the device J which is ranked the highest in terms of the connection quality is selected out of the devices A, J, and thereafter the data is forwarded so that the device J relays the data. The data transmission from the device J to the device A is performed in the same manner.

Next, as for data transmission from the device A to the device F, even though the connection quality with the sibling device F is higher than that with the parent device R, data transmission to the parent device R is selected in this case. This is because a necessary threshold value of the connection quality with a parent device is set to 15 and the connection quality with the root device R being the parent device satisfies this. In such a case, the parent device is selected with a higher priority in this mode.

More general definition of this mode is as follows. That is, based on the information regarding the connection quality with the parent device, it is determined whether or not the connection quality with each of the devices registered and stored as the parent devices satisfies the predetermined necessary threshold value, and when a result of this determination for at least one of the parent devices is true, a device which is ranked the highest in terms of the connection quality is selected out of the parent devices and thereafter information that is to reach the root device R from the own device is forwarded so that this device relays the information. Then, when the result of this determination is false in all the parent devices, a device which is ranked the highest in terms of the connection quality is selected out of the devices registered and stored as the sibling devices, based on the information regarding the connection qualities with the sibling devices, and thereafter the data is forwarded so that this device relays the data.

This mode is also a mode intended to make use of the sibling devices as well for the data transmission to the root device, similarly to the above-described mode. A difference lies in that, in this mode, the parent devices and the sibling devices are not regarded as being of the same priority, but the parent device is selected with a higher priority. The sibling devices are hierarchically located at the same level as the own device, and giving a higher priority to the parent devices is thought to be rational in the context of the data transmission to the root device.

Incidentally, in this mode, when the connection quality with any of the parent devices does not reach the necessary threshold value and there is no alternative but to use a sibling device, there is a possibility that a sibling device with which the connection quality is poorer than that of any of the parent devices is selected as a result. To avoid this, for example, the connection quality with the sibling device that is forced to be selected is examined, and when the connection quality is poorer than the connection qualities with all of the parent devices, a parent device having the best connection quality is selected out of the parent devices.

EXPLANATION OF REFERENCE SIGNS

11: hello packet receiving unit; 12: own-device hierarchical number setting unit (update setting unit, new parent candidate presence determining unit); 12a: own-device hierarchical number storing unit; 13: parent device/sibling device/child device registering and storing unit (update registering and storing unit); 13A: parent device (appended with connection quality information)/sibling device (appended with connection quality information)/child device registering and storing unit (update registering and storing unit); 14: other-device registration information transmitting unit; 15: own-device registration information receiving unit; 16: hello packet transmitting unit; 21: information forwarding and receiving unit; 22: forwarded and received information processing unit; 23: connection state determining unit; 31: connection quality information obtaining unit; A, B, C, D, E, F, G, H, I, J, K, L, M, N: communication device; R: root device

What is claimed is:

1. A communication method comprising:
   receiving a first hello packet broadcast from one or more transmitting devices, each first hello packet including, as information, at least an identifier of its respective transmitting device and a hierarchical number indicating a number of hops necessary for the transmitting device to communicate with a root device located at a highest level of a hierarchical structure;
   setting an own-device hierarchical number being a hierarchical number of an own device, to a value obtained by adding one to a smallest hierarchical number in the one or more transmitting devices;
   registering and storing, as a parent device, each transmitting device having a hierarchical number smaller than the own-device hierarchical number by one, out of the one or more transmitting devices;

registering and storing, as a sibling device, each transmitting device having a same hierarchical number as the own-device hierarchical number, out of the one or more transmitting devices;

registering and storing, as a child device, each transmitting device having a hierarchical number larger than the own-device hierarchical number by one or more, out of the one or more transmitting devices;

transmitting first other-device registration information so as to make the first other-device registration information reach the parent device, the first other-device registration information being information including an indication of having been retained as the parent device;

transmitting second other-device registration information so as to make the second other-device registration information reach the sibling device, the second other-device registration information being information including an indication of having been retained as the sibling device;

transmitting third other-device registration information so as to make the third other-device registration information reach the child device, the third other-device registration information being information including an indication of having been retained as the child device;

when the first other-device registration information, the second other-device registration information, and the third other-device registration information are transmitted from other devices so as to reach the own device, receiving the first other-device registration information, the second other-device registration information, and the third other-device registration information respectively as first own-device registration information, second own-device registration information, and third own-device registration information;

registering and storing each transmitting device being a source device of the first own-device registration information, as the child device;

registering and storing each transmitting device being a source device of the second own-device registration information, as the sibling, device;

registering and storing: each transmitting device being a source device of the third own-device registration information, as the parent device;

broadcasting a second hello packet being a hello packet including, as information, at least an identifier of the own device and the own-device hierarchical number.

2. The communication method according to claim 1, further comprising:

performing a determination as to whether or not all of devices being retained as the parent device are in an out-of-range state;

when a result of performing the determination is true, newly registering and storing each device being retained as the sibling device, as the parent device; and newly setting the own-device hierarchical number to a value larger by one than a hierarchical number of a device newly retained as the parent device.

3. The communication method according to claim 1, further comprising:

performing a determination as to whether or not one or more new hello packets have been received, the one or more new hello packets each including: an identifier different from all of identifiers of devices being retained as the parent device, the sibling device, and the child device; and a hierarchical number smaller than the own-device hierarchical number by two or more; and when a result of performing the determination is true, newly setting the own-device hierarchical number to a value obtained by adding one to a smallest number of hierarchical numbers included in the one or more new hello packets.

4. The communication method according to claim 1, further comprising:

obtaining information regarding connection quality between the own device and each device being retained as the parent device, over the each device;

registering and storing pieces of the information regarding the connection quality in association with the each device being retained as the parent device; and selecting one or more devices ranked higher in terms of connection quality, out of the each device being retained as the parent device, based on the information regarding the connection quality, and forwarding a frame that is to reach the root device from the own device, so as to make the frame relayed by the one or more devices ranked higher.

5. The communication method according to claim 1, further comprising:

obtaining first connection quality information and second connection quality information, the first connection quality information being information regarding connection quality between the own device and each device being retained as the parent device, and the second connection quality information being information regarding connection quality between the own device and each device being retained as the sibling device;

registering and storing pieces of the first connection quality information and the second connection quality information in association with the each device being retained as the parent device or the sibling device; and selecting one or more devices ranked higher in terms of connection quality, out of the each device being retained as the parent device or the sibling device, based on the first connection quality information and the second connection quality information, and forwarding a frame that is to reach the root device from the own device so as to make the frame relayed by the one or more devices ranked higher.

6. The communication method according to claim 1, further comprising:

obtaining first connection quality information and second connection quality information, the first connection quality information being information regarding connection quality between the own device and each device being retained as the parent device, and the second connection quality information being information regarding connection quality between the own device and each device being retained as the sibling device;

registering and storing pieces of the first connection quality information and the second connection quality information in association with the each device being retained as the parent device or the sibling device;

based on the first connection quality information, performing a determination as to whether or not connection quality in the each device being retained as the parent device satisfies a predetermined necessary threshold value;

when at least one result of the determination about the each device being retained as the parent devices is true, selecting one device ranked highest in terms of the connection quality, out of the each device being retained as the parent device, and forwarding a frame that is to reach the root device from the own device so as to make the frame relayed by the one device ranked highest; and when all of results of the determination about the each device being retained as the parent device are false, selecting another one device ranked highest in terms of the connection quality, out of the each device being retained as the sibling device, based on the second connection quality information, and forwarding the frame that is to reach the root device from the own device so as to make the frame relayed by the other one device ranked highest.

\* \* \* \* \*